(12) United States Patent
Chae et al.

(10) Patent No.: US 9,813,957 B2
(45) Date of Patent: Nov. 7, 2017

(54) METHOD AND APPARATUS FOR RECEIVING SIGNAL OF NEIGHBORING CELL SIGNAL BY D2D TERMINAL IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 46 days.

(21) Appl. No.: 14/864,647

(22) Filed: Sep. 24, 2015

(65) Prior Publication Data

US 2016/0095024 A1 Mar. 31, 2016

Related U.S. Application Data

(60) Provisional application No. 62/055,640, filed on Sep. 25, 2014, provisional application No. 62/062,138, filed on Oct. 9, 2014.

(51) Int. Cl.

| | |
|---|---|
| *H04L 12/56* | (2006.01) |
| *H04W 36/00* | (2009.01) |
| *H04W 8/00* | (2009.01) |
| *H04W 72/04* | (2009.01) |
| *H04L 5/00* | (2006.01) |
| *H04W 4/00* | (2009.01) |

(Continued)

(52) U.S. Cl.
CPC ....... *H04W 36/0083* (2013.01); *H04L 5/0044* (2013.01); *H04L 5/0092* (2013.01); *H04W 4/005* (2013.01); *H04W 8/005* (2013.01); *H04W 36/0061* (2013.01); *H04W 72/042* (2013.01); *H04L 5/14* (2013.01); *H04L 27/26* (2013.01); *H04W 76/023* (2013.01)

(58) Field of Classification Search
CPC ........... H04W 72/0406; H04W 72/042; H04W 72/044; H04W 72/0453; H04W 72/08; H04W 72/082; H04W 72/085
See application file for complete search history.

(56) References Cited

U.S. PATENT DOCUMENTS

2010/0273506 A1\* 10/2010 Stern-Berkowitz ... G01S 5/0009
455/456.1
2012/0243431 A1 9/2012 Chen et al.
(Continued)

OTHER PUBLICATIONS

ZTE, "Resource Allocation for Type 1 Discovery," 3GPP TSG-RAN WG1 #76, R1-142231, May 2014, 5 pages.
PCT International Application No. PCT/KR2015/010130, Written Opinion of the International Searching Authority dated Jan. 12, 2016, 10 pages.
(Continued)

*Primary Examiner* — Alvin Zhu
(74) *Attorney, Agent, or Firm* — Lee, Hong, Degerman, Kang & Waimey PC

(57) ABSTRACT

Disclosed herein is a method for receiving a signal of a neighboring cell by a Device-to-Device (D2D) terminal in a wireless communication system. The method includes receiving an offset parameter and a periodicity parameter, determining a resource pool of the neighboring cell in consideration of relation between the periodicity parameter and a maximum possible number of subframes contained in a resource pool period set, and receiving the signal of the neighboring cell in the determined resource pool.

14 Claims, 15 Drawing Sheets

(a)

(b)

(51) Int. Cl.
*H04L 27/26* (2006.01)
*H04W 76/02* (2009.01)
*H04L 5/14* (2006.01)

(56) References Cited

U.S. PATENT DOCUMENTS

| | | |
|---|---|---|
| 2013/0109301 A1 | 5/2013 | Hakola et al. |
| 2014/0057670 A1 | 2/2014 | Lim et al. |
| 2014/0281782 A1 | 9/2014 | Tyrrell et al. |
| 2015/0223245 A1* | 8/2015 | Cheng .................. H04W 48/16 370/329 |
| 2016/0021625 A1* | 1/2016 | Li ...................... H04W 72/1289 370/336 |
| 2016/0044665 A1* | 2/2016 | Novlan ............. H04W 72/0446 370/336 |

OTHER PUBLICATIONS

Qualcomm Incorporated, "Signaling Details for ProSe Direct Discovery," 3GPP TSG-RAN WG2 #86, R2-142540, XP050818539, May 2014, 8 pages.

Etri, "Resource allocation for D2D Discovery," 3GPP TSG Ran WG1 Meeting #76, R1-140852, XP050770719, Feb. 2014, 8 pages.

3rd Generation Partnership Project (3GPP), "Technical Specification Group Radio Access Network; Study on LTE Device to Device Proximity Services; Radio Aspects (Release 12)," 3GPP TR 36.843 V12.0.1, XP050770026, Mar. 2014, 50 pages.

LG Electronics, Discussion on Remaining Details of Resource Pool Configuration, 3GPP TSG RAN WG1 Meeting #78bis, R1-144021, XP50869685, Oct. 2014, 6 pages.

European Patent Office Application Serial No. 15002770.4, Search Report dated Jan. 26, 2016, 14 pages.

* cited by examiner

FIG. 18
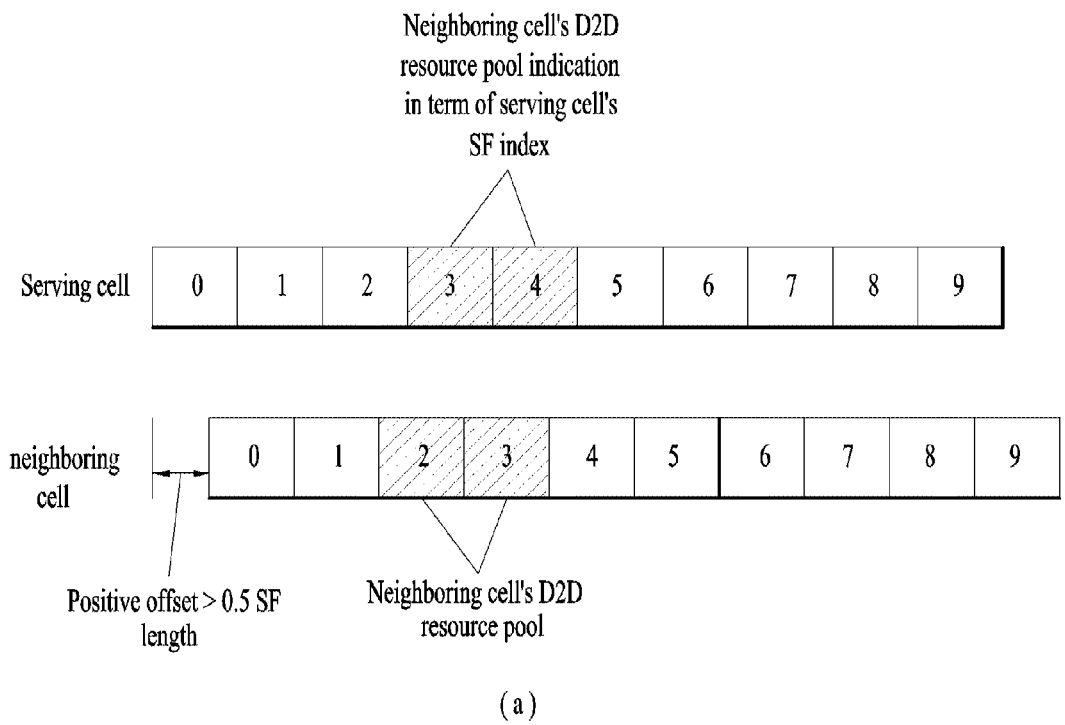
(a)
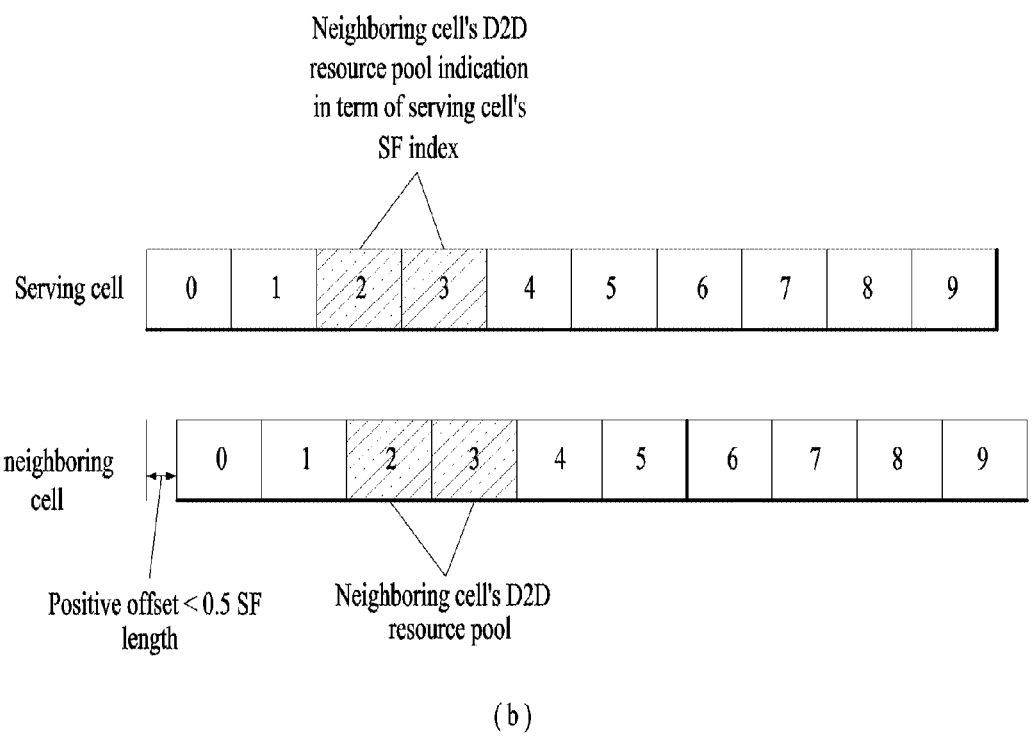
(b)

METHOD AND APPARATUS FOR RECEIVING SIGNAL OF NEIGHBORING CELL SIGNAL BY D2D TERMINAL IN WIRELESS COMMUNICATION SYSTEM

CROSS REFERENCE TO RELATED APPLICATIONS

Pursuant to 35 U.S.C. §119(e), this application claims the benefit of U.S. Provisional Patent Application Nos. 62/055,640, filed on Sep. 25, 2014 and 62/062,138, filed on Oct. 9, 2014, the contents of which are hereby incorporated by reference herein in its entirety.

BACKGROUND OF THE INVENTION

Field of the Invention

The present disclosure relates to a wireless communication system and, more particularly, to a method for receiving a signal of a neighboring cell through device-to-device communication and an apparatus for the same.

Discussion of the Related Art

A wireless communication system has been extensively developed to provide various types of communication services such as audio, data, etc. In general, the wireless communication system is a multiple access system capable of supporting communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, a multi-carrier frequency division multiple access (MC-FDMA) system, etc.

Device-to-device (D2D) communication refers to a communication scheme in which audio, data, etc. are directly exchanged between user equipments (UEs) without passing through a base station (evolved NodeB (eNB)) by configuring a direct link between the UEs. D2D communication may include a scheme such as UE-to-UE communication, peer-to-peer communication, etc. In addition, the D2D communication scheme may be applied to machine-to-machine (M2M) communication, machine type communication (MTC), etc.

D2D communication is considered as a scheme capable of relieving a burden on a base station resulting from rapidly increasing data traffic. For example, according to D2D communication, network overload may be reduced since data is exchanged between devices without passing through a base station unlike a conventional wireless communication system. In addition, when D2D communication is introduced, it is possible to achieve effects such as a reduction in procedures of a base station, a reduction in power consumption of devices participating in D2D communication, an increase in data transfer rate, an increase in network capacity, load balancing, extension of cell coverage, etc.

SUMMARY OF THE INVENTION

Accordingly, the present invention is directed to a method for a D2D UE to receive a signal of a neighboring cell in a wireless communication system and an apparatus for the same that substantially obviate one or more problems due to limitations and disadvantages of the related art.

An object of the present invention is to provide methods for receiving a neighboring cell signal through D2D communication, particularly TDD.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for receiving a signal of a neighboring cell by a Device-to-Device (D2D) terminal in a wireless communication system includes receiving an offset parameter and a periodicity parameter, determining a resource pool of the neighboring cell in consideration of relation between the periodicity parameter and a maximum possible number of subframes contained in a resource pool period set, and receiving the signal of the neighboring cell in the determined resource pool.

In another aspect of the present invention, there is provided a Device-to-Device (D2D) terminal in a wireless communication system including a reception module, and a processor, wherein the processor is configured to receive an offset parameter and a periodicity parameter, determine a resource pool of the neighboring cell in consideration of relation between the periodicity parameter and a maximum possible number of subframes contained in a resource pool period set, and receive the signal of the neighboring cell in the determined resource pool.

When the periodicity parameter is a value that is not the divisor of the maximum possible number of subframes, the D2D terminal may assume that system frame numbers (SFNs) of the neighboring cell are aligned with SFNs of a serving cell.

When the periodicity parameter is a value that is not the divisor of the maximum possible number of subframes, the TDD configuration may correspond to configuration 0.

The periodicity parameter may be 70 ms.

When determining of the resource pool of the neighboring cell is performed, an offset may be applied based on SFN (system frame number) 0 of the serving cell.

The maximum possible number of subframes may be 10240.

When a period of the resource pool exceeds the maximum possible number of subframes, the period of the resource pool may be re-determined based on SFN (system frame number) 0 of the serving cell.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 12, 13, 14, 15, 16, 17 and 18 illustrate signaling of a time resource region, reception of a synchronization signal of a neighboring cell, and acquisition of configuration of neighboring cell resources therethrough;

DETAILED DESCRIPTION OF THE INVENTION

Figure 1:
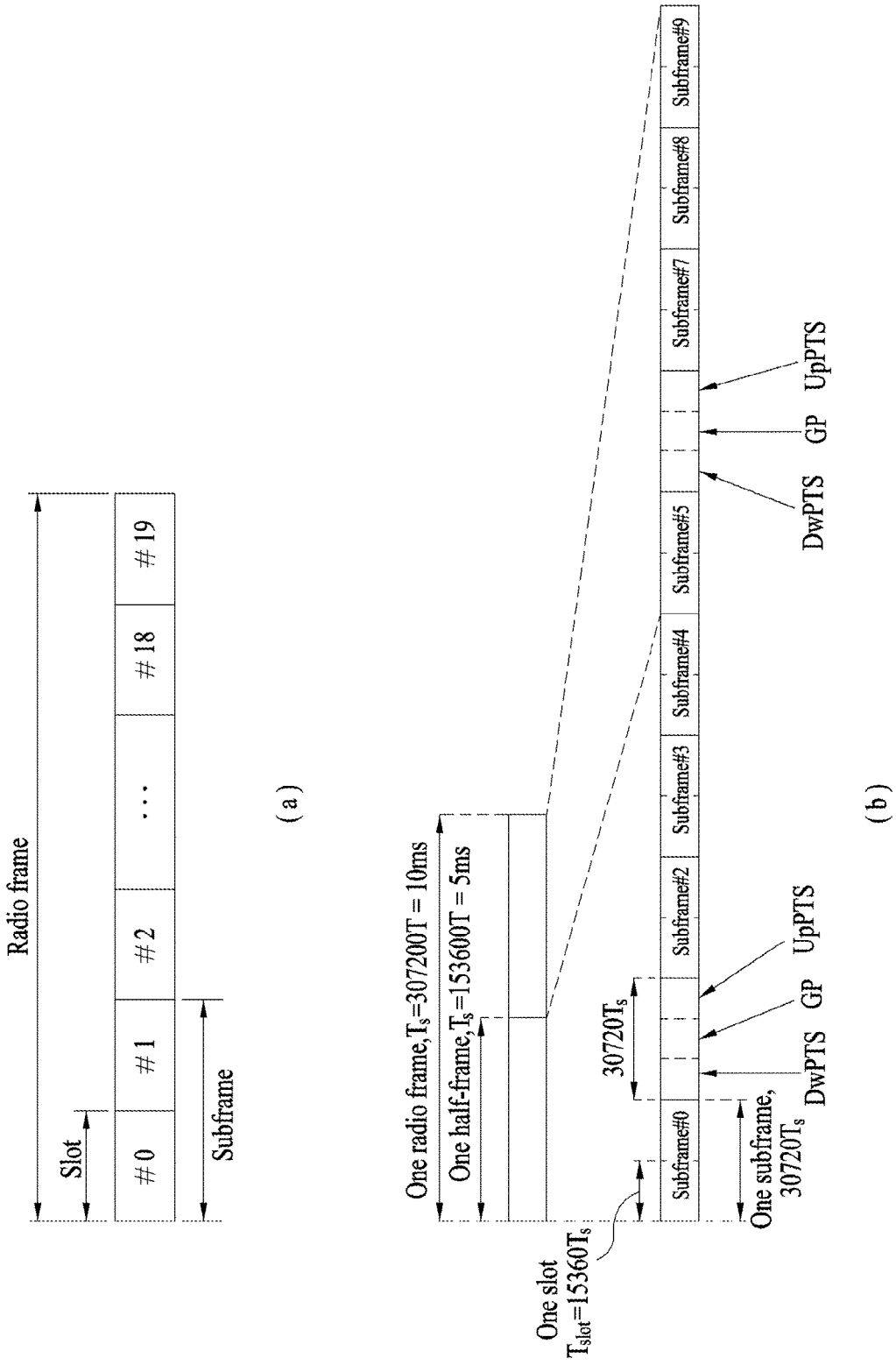
FIG. 1 illustrates a radio frame structure.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3$^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Configuration/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
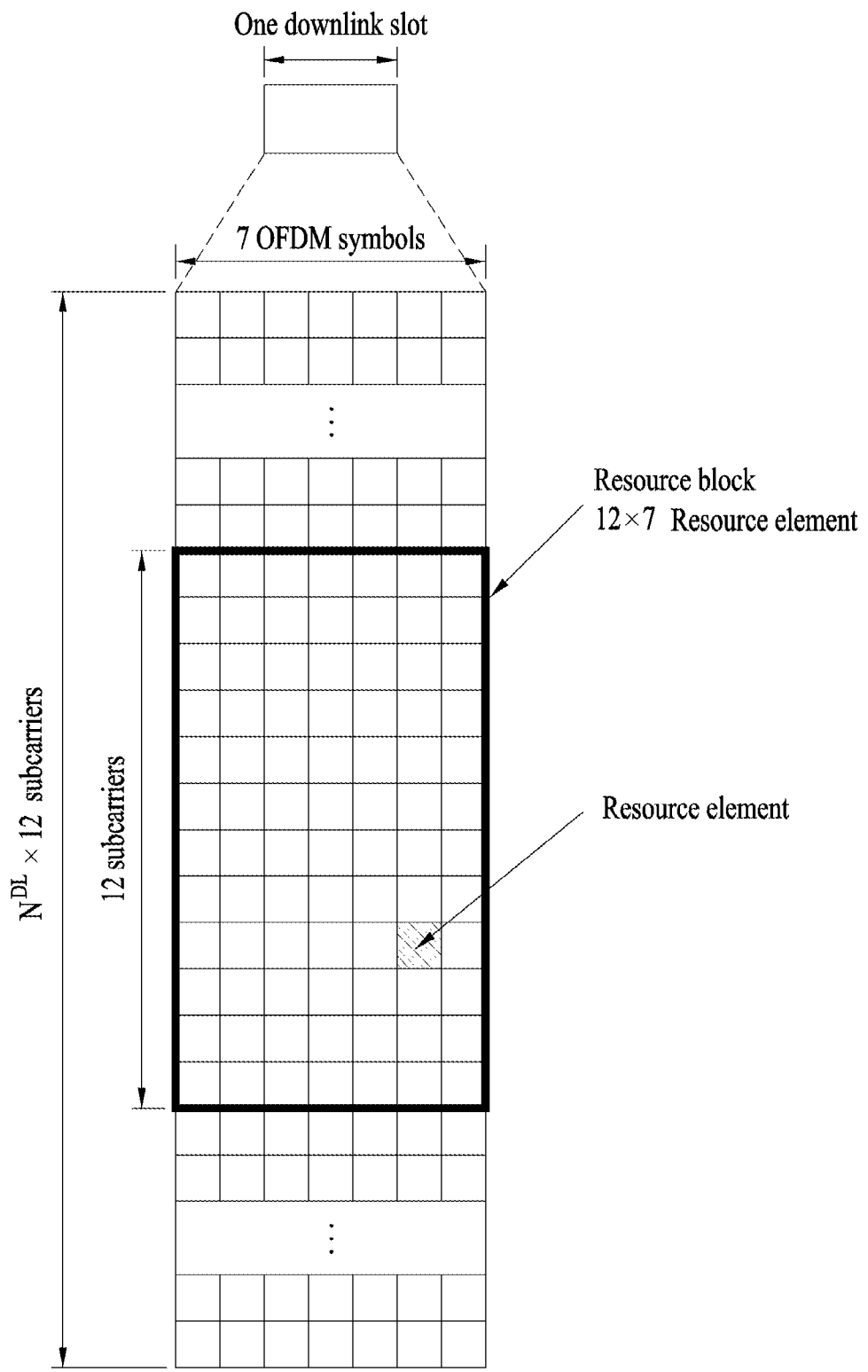
FIG. 2 illustrates a downlink resource grid for one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, $N^{DL}$ depends on a downlink transmission bandwidth. An uplink slot may have the same structure as a downlink slot.

Figure 3:
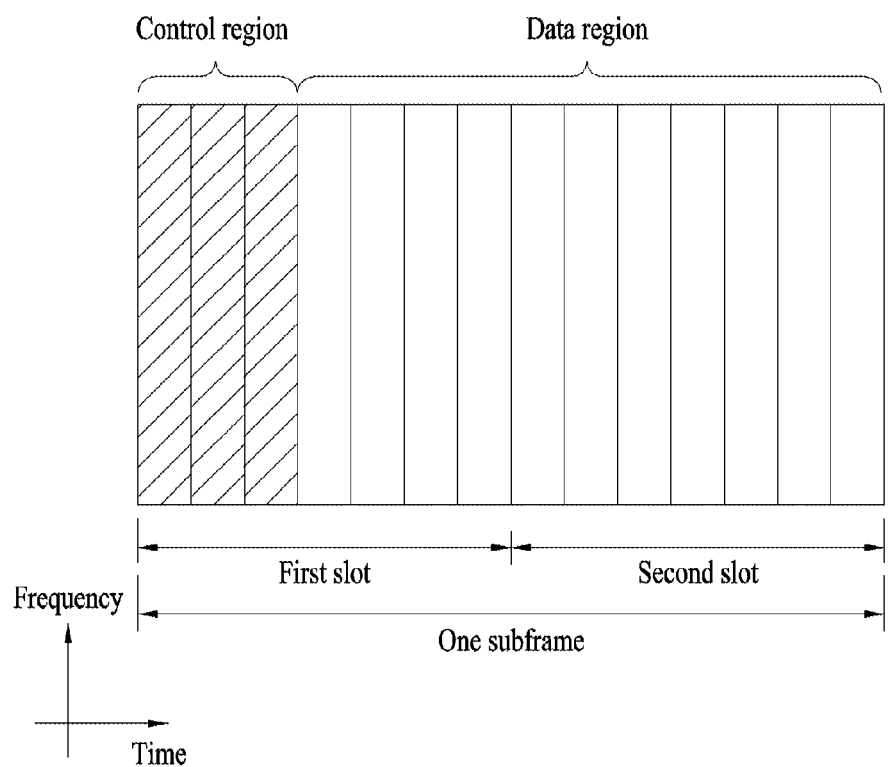
FIG. 3 illustrates the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response, in response to a Random Access Preamble transmitted by a UE, its CRC may be masked by a Random Access-RNTI (RA-RNTI).

Figure 4:
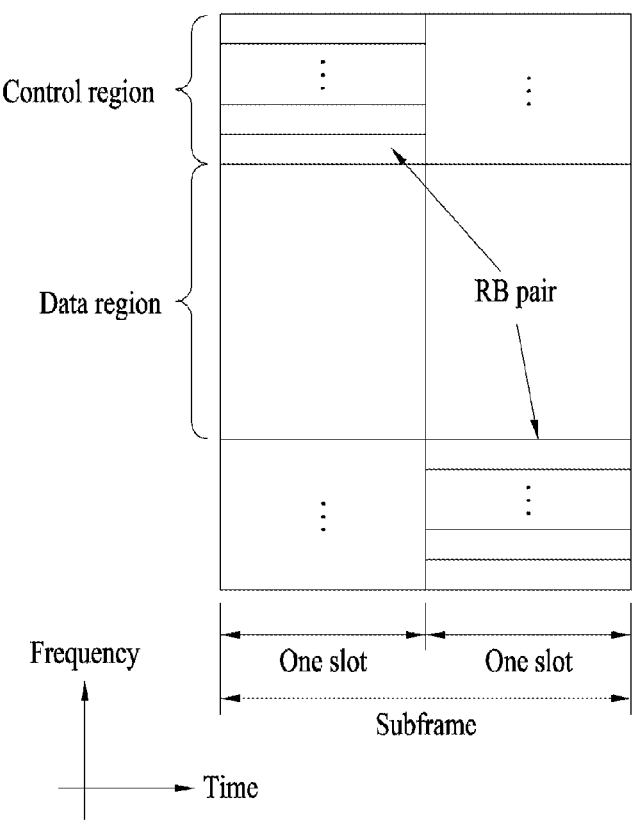
FIG. 4 illustrates the structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Acquisition of Synchronization Between D2D UEs

Hereinafter, description will be given of acquisition of synchronization between UEs in D2D communication based on the above description and the legacy LTE/LTE-A system. If time/frequency synchronization is not matched in the OFDM system, OFDM signals may not be multiplexed between different UEs due to inter-cell interference. It is inefficient for all D2D UEs to individually match synchronization by directly transmitting and receiving a synchronization signal. Accordingly, in a distributed node system such as the D2D system, a specific node may transmit a representative synchronization signal, and the other UEs may match synchronization therewith. In other words, to perform transmission and reception of a D2D signal, some nodes (which may be referred to as eNBs, UEs, SRNs (synchronization reference nodes) or synchronization sources) may periodically transmit a D2D synchronization signal (D2DSS), and the other UEs may transmit or receive a signal in synchronization therewith.

The transmission period of D2DSS is shorter than 40 ms, and at least one symbol in a subframe (SF) may be used for transmission of the D2DSS.

The D2DSSs may include a primary synchronization signal (primary D2DSS (PD2DSS) or primary sidelink synchronization signal (PSSS)) and a secondary synchronization signal (secondary D2DSS (SD2DSS) or secondary sidelink synchronization signal (SSSS)). The PD2DSS may have a similar/modified/repeated structure of a Zadoff-Chu sequence having a predetermined length or a PSS. The SD2DSS may have a similar/modified/repeated structure of an M-sequence or an SSS.

When a D2D UE selects a D2D synchronization resource, the same priority reference should be applied. In a situation out of the coverage, the UE may become a synchronization source if strengths of all received D2DSSs are less than a preset value. In the coverage, a UE may be configured as a synchronization resource by an eNB. If UEs match synchronization with an eNB, the eNB may be the synchronization source, and the D2DSS may be a PSS/SSS. A synchronization resource derived from the eNB may be different from a synchronization resource which is not derived from the eNB.

The physical D2D synchronization channel (PD2DSCH) may be a (broadcast) channel on which basic (system) information (e.g., information related to the D2DSS, the duplex mode (DM), TDD UL/DL configuration, resource pool-related information, the type of an application related to the D2DSS, etc.) which a UE needs to check before transmitting and receiving a D2D signal is transmitted. The PD2DSCH may be transmitted in the subframe in which the D2DSS is transmitted or in a subsequent subframe.

The D2DSS may take the form of a specific sequence, and the PD2DSCH may take the form of a sequence representing specific information or a codeword obtained through predetermined channel coding. Herein, the SRN may be an eNB or a specific D2D UE. In the case of "partial network coverage" or "out of network coverage", a UE may be the synchronization source.

Figure 5:
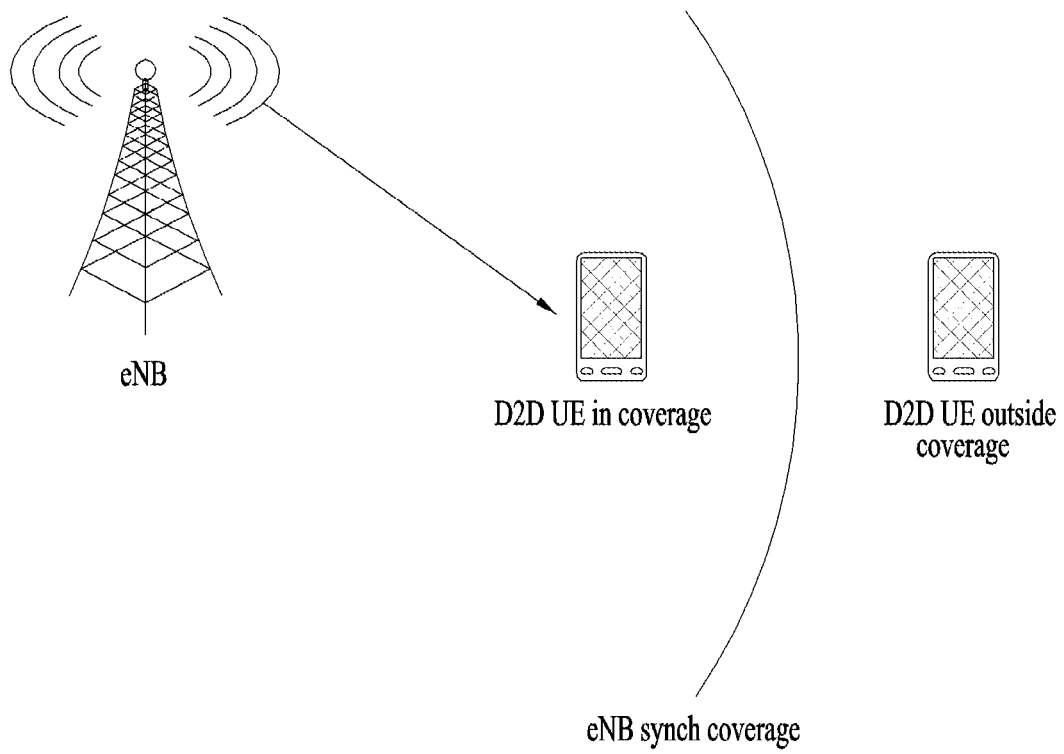
FIG. 5 illustrates relay of a synchronization signal.

In the situation illustrated in FIG. 5, the D2DSS may be relayed for D2D communication with a UE out of the coverage. The D2DSS may be relayed through multiple hopping. In the following description, relaying a synchronization signal means not only direct AF relay of a synchronization signal of an eNB but also transmission of a D2D synchronization signal of a separate format at the reception time of the synchronization signal. As the D2D synchronization signal is relayed as above, direct communication may be performed between a UE in the coverage and a UE out of the coverage.

Figure 6:
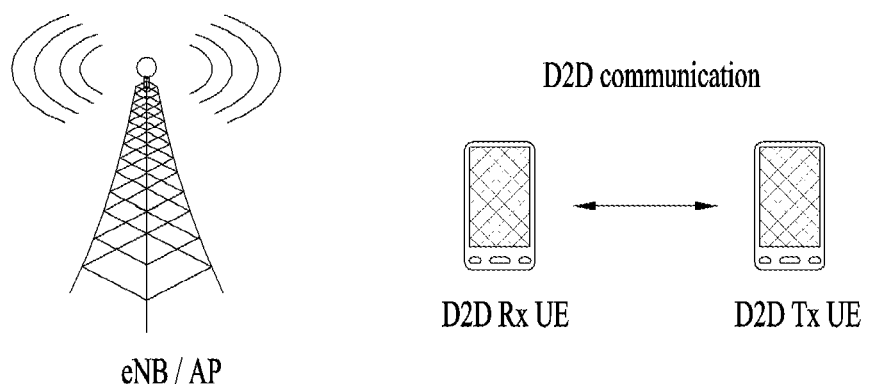
FIG. 6 illustrates a communication environment to which an embodiment of the present invention is applicable.

FIG. 6 illustrates an exemplary situation in which a D2D UE 610 receives signals from a relay UE 620 and a D2D UE 610. In this case, the D2D UE needs to distinguish a signal transmitted by the relay UE and a signal transmitted by the D2D UE. If the relay UE allows a UE out of the coverage to access the network for the purpose of public safety (PS), the signal from the relay UE may need to be distinguished from a typical D2D signal. Although not shown in the figure, it may also necessary to identify whether the signal received by the D2D UE is a signal transmitted by a PS UE or a signal transmitted by a non-PS (NPS) UE. Hereinafter, description will be given of a method for a D2D UE to determine whether the received signal is from a relay UE or a typical D2D UE (or from a PS UE or an NPS UE). For simplicity, the description will be given of a method for identifying whether the UE having transmitted the signal is the relay UE or a typical D2D UE. However, this method may also be used in identifying weather the UE having transmitted the signal is a PS UE or an NPS UE.

Hereinafter, description will be given of a method for determining a D2D time and/or frequency resource pool, a method for signaling the same, and methods for receiving a D2D synchronization signal in relation to a neighboring cell and determining a D2D resource of the neighboring cell, based on the above description. The following description relates to an apparatus/D2D UE performing D2D communication as illustrated in FIG. 6. An eNB or an access point (AP) transmitting a signal in the form of the D2D signal may also be viewed as an apparatus/D2D UE performing D2D communication. Regarding transmission and reception of a D2D signal, D2D transmission/communication mode 1 may represent a scheme in which an eNB directly designates positions of transmission resources to perform D2D communication, and D2D transmission/communication mode 2 may represent a scheme in which a pool of resources is designated by an eNB or pre-designated, and a UE selects a specific resource from the pool and uses the same to transmit a D2D communication packet. In addition, discovery type 1 may represent a scheme in which the eNB designates a pool of resources, and the UE selects a specific resource from the pool and uses the same to transmit a discovery signal, and discovery type 2 may represent a scheme in which the eNB directly designates the position of a resource on which the UE transmits a discovery signal. The description given below may be mainly applied to mode 2 and discovery type 1, but embodiments of the present invention are not limited thereto. The method proposed below may also be applied to a pool in which a D2D control signal (e.g., scheduling assignment (SA), D2DSS (D2D synchronization signal)) is transmitted. Herein, the SA may represent a signal through which a D2D control signal is transmitted, and may include information indicating the position where D2D data is transmitted and a transmission format of the D2D data. Hereinafter, description will be given of a method for configuring a D2D resource pool regardless of the D2D signal type. Different methods for configuring a pool may be used for different types of D2D signals.

Signaling of a resource pool may be implemented in the manner of one of RRC signaling, signaling through SIB and signaling through a (UE-specific or common) PDCCH/EPDCCH. Alternatively, a resource pool set may be pre-signaled through RRC, and a D2D resource pool to be applied for a specific SF or a specific radio frame or for a certain period (e.g. 40 ms) may be signaled over the (E)PDCCH.

Determination of Frequency Resource Pool and Signaling for the Same

A D2D UE may determine a time-frequency resource region in which the D2D UE is to transmit a D2D signal in a subframe, and transmit a D2D signal through the determined time-frequency resource region. Herein, the time resource, namely a subframe in which the D2D signal is transmitted may be determined using a method devised by the inventors of the present invention and disclosed in PCT/KR2015/003534. In addition, the frequency resource region, namely PRB(s) on which the D2D signal is transmitted in a subframe for D2D transmission may be determined by parameters (RB indexes indicating the start point and end point of the resource region, and a parameter for the size of the resource region) indicated through, for example, higher layer signaling.

More specifically, the frequency resource region in the subframe in which the D2D signal will be transmitted may include a first frequency resource region and a second frequency resource region. The positions of the first frequency resource region and the second frequency resource region may be determined by independent parameters, and the size of the first frequency resource region and the second frequency resource region may be determined by a common parameter. If the two frequency resource regions have the same size (determined by the common parameter), a gain may be obtained in terms of signaling overhead, frequency diversity, and fairness of resource allocation by determining the positions of the frequency resource regions. More specifically, if only one frequency resource region is determined by taking only signaling overhead into account, the diversity gain cannot be obtained. If the positions and sizes of the two frequency resource regions are determined by the common parameter, a gain may be obtained in terms of signaling overhead. However, in the case where resources are allocated to multiples UEs, diversity gains for the UEs may be unequal.

The independent parameters may be Start PRB index, which is an RB index of the start point, and End PRB index, which is an RB index of the end point, and the common parameter may be the number of PRBs indicating the size of a resource region. Of the PRB indexes, PRBs having an index higher than or equal to Start PRB index and lower than Start PRB index+the number of PRBs may be included in the first frequency resource region, and PRBs having an index higher than End PRB index–the number of PRBs and lower than End PRB index may be included in the second frequency resource region.

The D2D signal transmitted on the resources determined using the method described above may be a D2D data signal transmitted over a physical sidelink shared channel (PSSCH), a discovery signal transmitted over a physical sidelink discovery channel (PSDCH) or a D2D control signal transmitted over a physical sidelink control channel (PSCCH).

If the frequency region of the D2D signal is divided into two regions to be allocated, resources for cellular signal transmission may be prevented from being fragmented. Particularly, for the SC-FDMA modulation scheme which is used for an LTE uplink signal, the peak-to-average power ratio (PAPR) is lowered only when D2D resources are consecutively allocated in the frequency region. If D2D resource regions are non-consecutively allocated to both ends of the system bandwidth in the frequency domain, cellular resources may use consecutive middle frequency regions and thus fragmentation of the frequency regions of the cellular resources is prevented.

Hereinafter, description will be given of frequency resources for transmission of a D2D signal using a method according to another embodiment of the present invention. Description will be given in terms of signaling of information for determining frequency resources according to granularities of a frequency resource pool.

1) RB Unit

The basic unit of a frequency resource pool may be an RB, and a frequency resource pool may be signaled in an RB unit. For example, if 50 PRBs (10 MHz) are present in the system, and 3 RBs at each band edge are used for PUCCH, there may be 44 PUSCH PRBs and a 44 bit-bitmap for 44 PUSCH PRBs may be signaled. In this case, the bitmap in the frequency domain may be signaled by expressing the whole system frequency bandwidth through the region other than the PUCCH region. If the bitmap expresses the whole system frequency bandwidth, a frequency-domain resource pool is signaled in 50 bits according to an embodiment. If the frequency resource pool is signaled in an RB unit, but the actual unit in which the D2D signal is transmitted is configured by several RBs, a method to index D2D resources in the resource pool needs to be determined. In this case, one of the methods illustrated in FIGS. 7(a) to 7(d) may be used.

Figure 7:
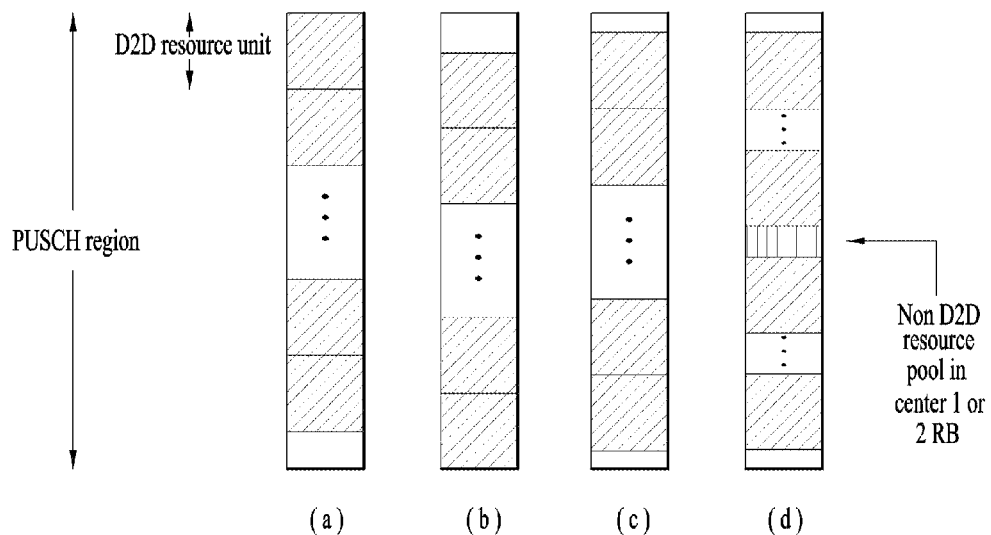
FIGS. 7, 8, 9, 10 and 11 illustrate configuration and signaling of a frequency resource region according to an embodiment of the present invention.

FIG. 7(a) illustrates a method of determining D2D resource indexes from the lowest D2D resource index. If a frequency resource pool is arranged as $\{0, \ldots, N-1\}$ in the order of RBs and one D2D signal is configured by M RBs, indexing may be performed in the manner of D2D resource index $0=\{0, \ldots, M-1\}$, D2D resource index $1=\{M, \ldots, 2*M-1\}$, ..., D2D resource index floor(N/M)–1=$\{M*(\text{floor}(N/M)-1), \ldots, M*\text{floor}\{N/M\}-1\}$. As shown in the figure, the last few RBs of the resource pool may not be used.

FIG. 7(b) illustrates a method of allocating D2D resources with RBs having higher frequency resource indexes. In contrast with the method of FIG. 7(a), some RBs assigned lower indexes in the frequency resource pool may not be used.

FIG. 7(c) illustrates a method of arranging D2D resources as close to the center of the frequency resource pool as possible. For example, the center PRB index in the resource pool may be aligned to be used by the center index of the D2D resources. With this method, in-band emission to PUCCH or PUSCH may be attenuated.

Figure 8:
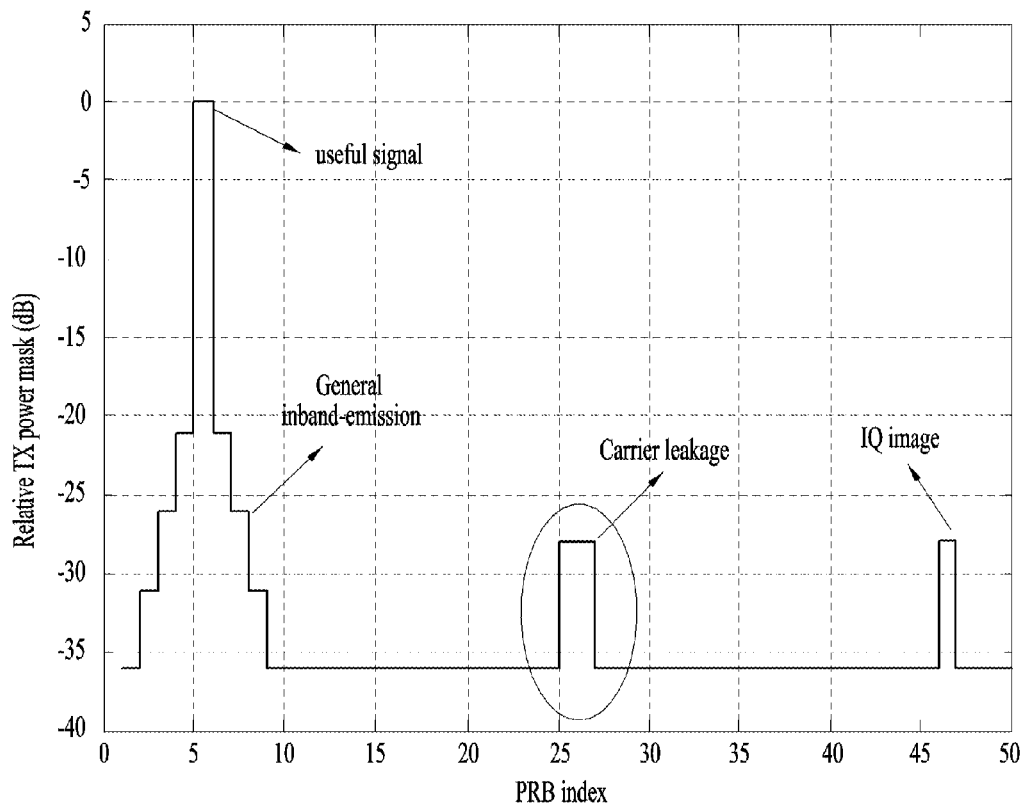

According to the method illustrated in FIG. 7(d), up to M–1 frequency regions are not used for D2D when N mod M is not 0. Herein, N is the number of RBs in the frequency domain, and M is the RB size of a region occupied by one D2D signal in the frequency domain. In this case, the first few RBs, the last few RBs, or the first few and the last few RBs may not be used for the D2D pool, or the center RB may not be used for the D2D pool. The center RB is subjected to stronger interference than the other regions due to carrier leakage as shown in FIG. 8 when in-band emission is considered. If several UEs perform transmission simultaneously, the center RB is likely to be subjected to strong interference because carrier leakages of the UEs overlap. Therefore, the center RB may be excluded when a resource pool is configured. For example, D2D resource pools may be indicated in order from the RB having the lowest frequency index except the center RB.

2) Unit of D2D Signal Unit Size

When a D2D resource pool is indicated, the granularity of the resource pool may be signaled in the unit of a D2D signal unit size. If the unit of D2D resources consists of multiple PRBs (or multiple SFs) rather than of one PRB, a bitmap in the D2D resource unit may be signaled. For example, if a discovery signal unit consists 2 PRB pairs, the frequency resource pool may be indicated by a bitmap in the unit of 2 PRBs. When some of 50 PRBs in the frequency domain are indicated as a D2D resource pool, a bitmap in units of PRBs needs 50 bits, but a bitmap in a D2D resource unit needs only 25 bits and thus the number of bits signaled is reduced.

When a D2D resource pool is indicated, the granularity of a D2D resource pool be signaled in the unit of a multiple of a D2D signal unit size (e.g., p times the D2D signal unit size). Herein, the value of p may be determined depending on the system bandwidth.

If there are various unit sizes for a D2D signal transmitted in one resource pool, a unit having the smallest unit size (or the largest unit size, or an intermediate or average unit size) be used as the resource pool indication granularity. If PRB sizes of MAC PDU of a D2D signal are 2, 3 and 4, the D2D resource pool is signaled in the unit of 2 PRBs. For example, when some of 50 PRB pairs in the frequency domain are signaled as a D2D resource pool, a 25-bit bitmap may be signaled.

Figure 9:
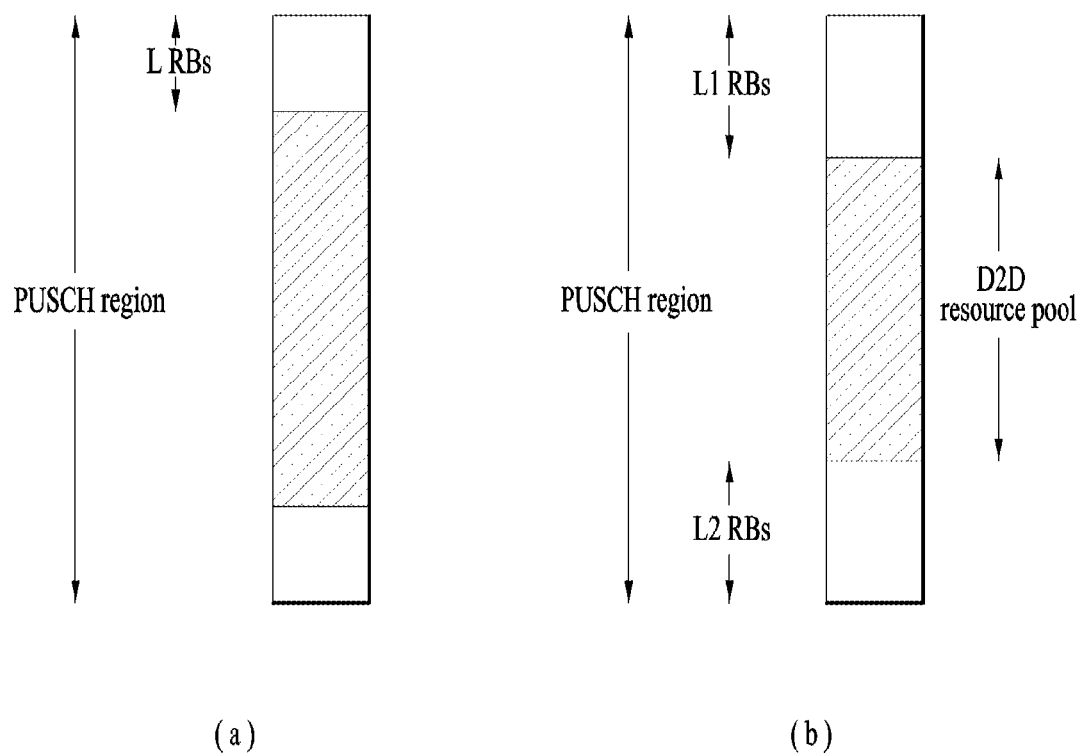

Hereinafter, description will be given of a method for determining and signaling a resource pool, with reference to FIGS. 9 to 11.

FIG. 9(a) illustrates a method in which an offset value L is signaled and the PUSCH region is used except L RBs at each of both edges of the region. Herein, the value of L is intended not only to protect the PUCCH region but also to prevent the D2D resource pool from differing among cells in performing inter cell D2D when the cells have different sizes of PUCCH regions. The value of L may be specifically set such that the D2D resource pool corresponds to an integer multiple of the D2D signal unit. FIG. 9(b) illustrates a method of setting two values L1 and L2 to indicate D2D resource pools. Similar to FIG. 9(a), L1 and L2 may be cell-specifically set.

Figure 10:
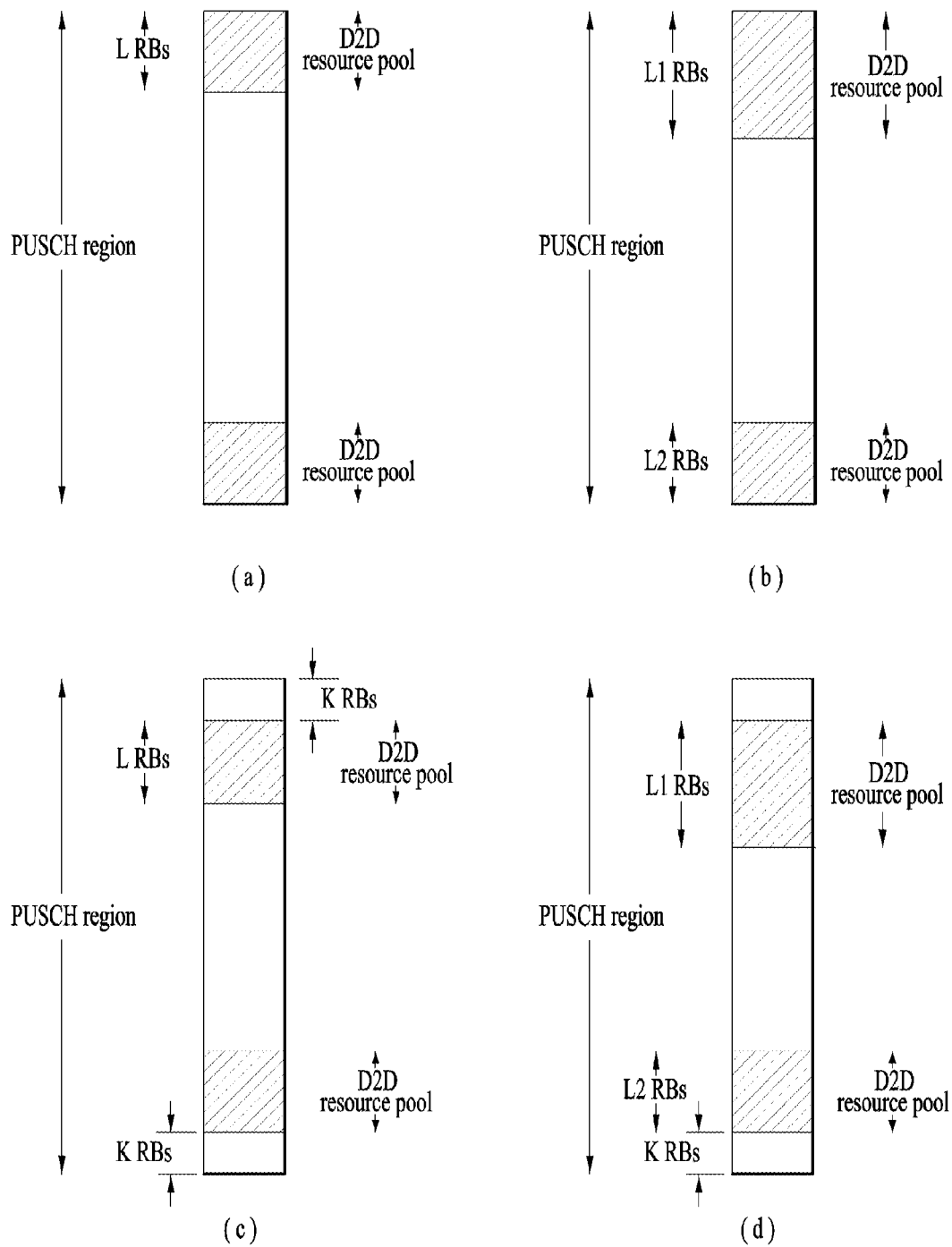
Figure 11:
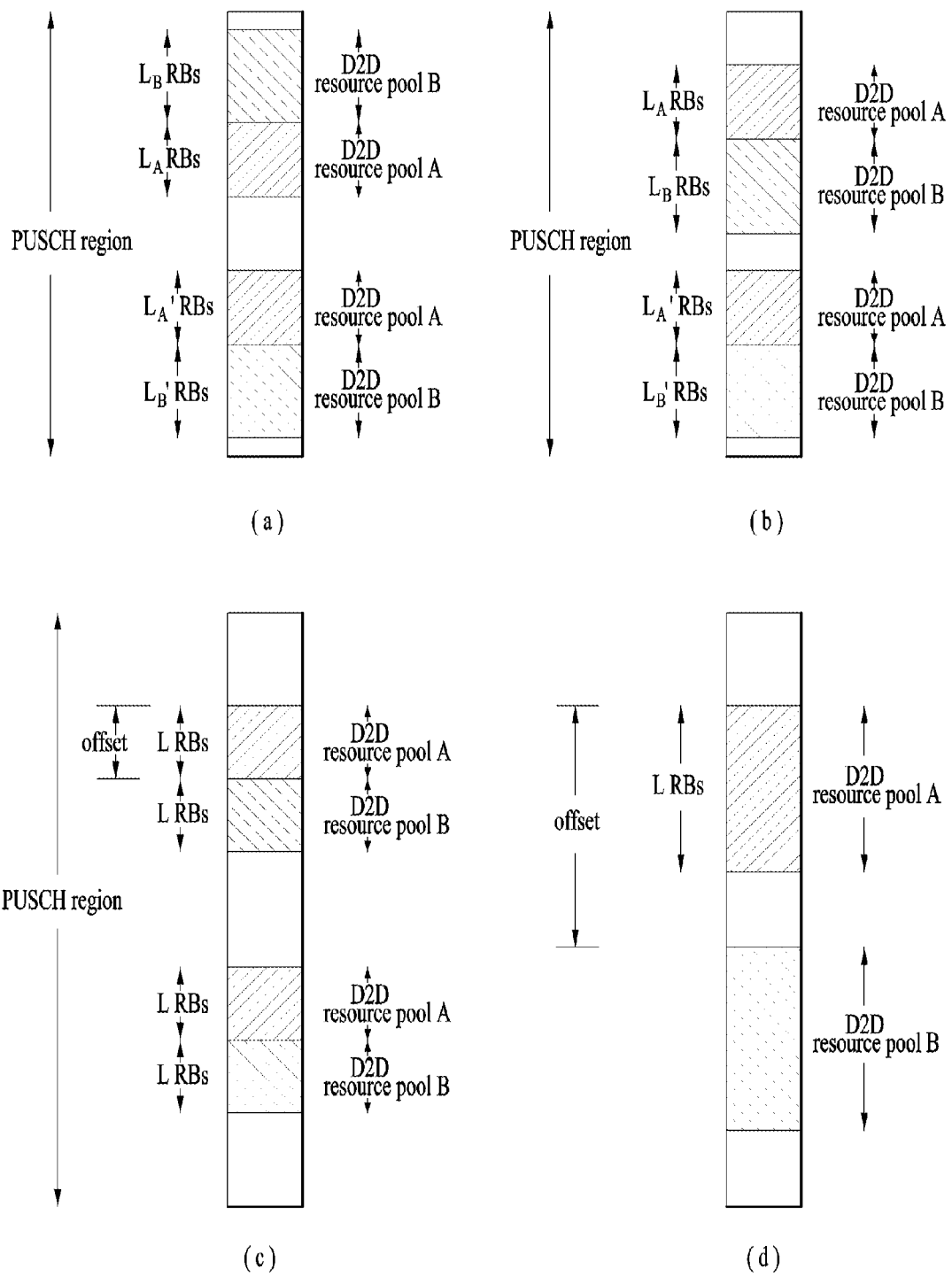

FIG. 10 illustrates a method of configuring D2D resources near the PUCCH region in order to prevent PUSCH resources of WAN from being divided into several regions. FIG. 10(a) illustrates a method for determining the resource region when only L is signaled, and FIG. 10(b) illustrates a method for determining the resource region when L1 and L2 are signaled. In methods illustrated in FIGS. 10(c) and 10(d), some RBs are used as a guard to protect the PUCCH region. To this end, a parameter K indicating the size of RBs to be used as a guard band may be additionally signaled or predetermined in addition to L or L1 and L2. In signaling K and L/L1/L2, i) both K and L (or L1, L2) may be signaled in an RB unit, ii) K may be signaled in an RB unit, and L (or L1, L2) may be signaled in a unit of the D2D signal unit size, or iii) both K and L (or L1, L2) may be signaled in a unit of the D2D signal unit size. FIGS. 10(c) and 10(d) illustrate determining a frequency resource region when a guard is used.

A D2D resource pool does not need to be symmetrical with respect to the center frequency in the frequency domain. To prevent (WAN) PUSCH resources from being segmented, the D2D resource pool may be biased to a band edge, namely configured to be non-contiguous in the frequency domain. By combining the two methods above, D2D resource pools asymmetrical with respect to the center frequency and non-contiguous in the frequency domain may be configured. The pools may be signaled as follows: i) RB indexes of the start and end points of each non-contiguous resource region in the frequency domain may be signaled; ii) In this case, if the non-contiguous frequency resource regions have the same size in one D2D resource pool, only one parameter for the size of resource regions may be signaled, thereby reducing signaling overhead. iii) In methods i) and ii), the start point and/or end point of the resource regions and/or the size of each resource region may be signaled in units of RBs or in the unit of a D2D signal unit size. If D2D signals having several sizes are transmitted in one resource pool, signaling may be performed based on the smallest unit size, the largest unit size or a specific unit size.

When the proposed methods are applied, if multiple D2D resource pools in a cell (e.g., a type 1 discovery resource pool and a type 2B discovery resource pool multiplexed in the frequency domain, or D2D resource pools of multiple cells) are configured on the same time resource (e.g. SF) or if multiple resource regions non-contiguous in the frequency domain are configured for each D2D resource pool, the non-contiguous resource regions of each D2D resource pool may be uniformly spaced in each resource pool. In this case, each D2D resource pool may obtain a uniform frequency diversity gain. When resource pools are configured only in the symmetric form in the frequency domain as shown in FIG. 11(a), if multiple D2D resource pools split in the frequency domain are configured on the same time resource, D2D resource pools allocated to a portion close to the center of the band may not obtain sufficient frequency diversity. If symmetry with respect to the center frequency is eliminated and resources are flexibly allocated to solve this problem, different D2D resource pools may be assigned frequency resources split with the same spacing. FIG. 11(b) illustrates an embodiment of configuration of D2D resource pools which are non-contiguous in the frequency domain and asymmetric with respect to the center frequency. Herein, two resource pools are multiplexed in the frequency domain, and have frequency resource regions split with the same frequency spacing. Thereby, when frequency hopping is applied in each D2D resource pool, similar frequency diversities may be obtained. The proposed method has flexibility of implementing all methods illustrated in FIGS. 9 and 10 according to parameter configurations.

In this embodiment, LA and LB may equal each other, and LA(LB) and LA'(LB') may also have the same value. The former case corresponds to a case where different resource pools multiplexed in the frequency domain are configured in the same manner, and the latter case corresponds to a case where non-contiguous resource regions are configured to have the same size in the frequency domain. Both cases may serve as additional restrictions in configuring resource pools. If the restrictions are configured, signaling overhead may be reduced. For example, if LA=LA', the start point of each non-contiguous resource region and LA may be signaled to reduce signaling overhead. Alternatively, the start point of the first resource region and the end point of the second resource region may be signaled, while LA RBs are defined to be used for the first resource region from the start point of the first resource region and LA RBs are used for the second resource region within the end point of the second resource region. While two non-contiguous resource regions have been illustrated as being configured in the frequency domain for one D2D resource pool in the embodiment above, the number of non-contiguous resource regions in the frequency domain is not limited to 2. In this case, the D2D resource pool may be split into three or more resource regions and signaled. In this case, a parameter indicating the number of resource regions into which one D2D resource pool is split in the frequency domain may be signaled through a higher layer signal.

Meanwhile, if multiple D2D resource pools are configured in a cell (or D2D resource pools of multiple cells are configured), a frequency resource region for each D2D resource pool may be separately signaled. In this case, in order to reduce signaling overhead, only one piece of frequency resource information about a D2D resource pool may be signaled, and a predetermined offset for the other resource pools may be signaled. Herein, the offsets may be expressed as units of RBs or as a multiple of the unit size of a specific D2D signal. For example, when resource regions are non-contiguously configured in the frequency domain as in the case of FIG. 11, if multiple resource pools are configured in a cell in the frequency domain, the start and end RBs of each resource region of one resource pool may be signaled, and then the other D2D resource pools may be configured using a predetermined offset (by additionally signaling only one parameter). FIGS. 11(c) and 11(d) illustrate an embodiment of configuring multiple D2D resource pools by signaling frequency resource information about one resource pool and an offset for expressing multiple pools. Specifically, FIG. 11(c) illustrates configuration of multiple non-contiguous D2D resource pools in the frequency domain, and FIG. 11(d) illustrates multiple contiguous D2D resource pools in the frequency domain.

The principle described above is also applicable when multiple D2D resource pools are configured in the time domain. For example, when multiple D2D resource pools are configured in the time domain, a predetermined offset may be signaled along with time resource information of a specific D2D resource pool to signal multiple D2D resource pools. With this method, however, when the predetermined offset is applied in TDD, some subframes may not be uplink subframes, and thus may not be usable as D2D resources. In this case, a rule may be established such that only subframes used for UL on an SIB or a DL reference configuration (a configuration having the smallest number of UL subframes in eIMTA) are configured as a valid D2D resource pool. For example, when a bitmap for a specific D2D resource pool is signaled, and an offset is signaled for the other D2D resource pools, only subframes which are D2D subframes in a shifted bitmap and UL subframes on an SIB (or DL reference configuration) are defined as a D2D resource pool.

In the aforementioned method, while D2D resource pools have been described as being configured such that some RBs at an edge of the PUSCH region remain unused, some edge RBs of the system bandwidth rather than of the PUSCH region may be configured not to be used. For example, L, L1, L2 and K may be set not cell-specifically but commonly to the network.

According to the aforementioned method, the granularity of a frequency resource pool may depend on the unit size of a D2D signal, but the start point of the D2D resource pool (or the values of offset from the PUCCH region, L, L1, L2 and K) may be signaled in units of RBs. For example, if the D2D unit size is 2 RBs, when it is assumed that a=ceil(log 2($N_{RB}^{UL}$−1)) in contiguously assigning D2D resource pools, the number of bits corresponding to a (indication of the start point)+ceil(log 2(floor(($N_{RB}^{UL}$−a)/2))) (indication of the resource pool size) may be used to indicate a resource pool.

Indication of Frequency Resource Pool Configuration

Configurations related to frequency resource pools according to the methods described above may be signaled through a bitmap. That is, the configurations may be signaled through a bitmap based on the frequency resource granularity described above. In this case, each bit may indicate whether or not the corresponding region is used for D2D in a frequency resource pool. As a specific method for signaling the bitmap, the legacy method for allocation of PUSCH resources may be used (see LTE specification 36.213 8.1). According to the legacy method for allocation of PUSCH resources, when it is assumed that the frequency PUSCH region includes N RBs, $\lceil \log_2(N_{RB}^{UL}(N_{RB}^{UL}+1)/2) \rceil$ bits are needed. If PUSCH resource allocation type 0 is used, the frequency region includes N RBs, and the frequency resource granularity M corresponds to 2 or more RBs, $N_{RB}^{UL}$ may be replaced by $\lfloor N_{RB}^{UL}/M \rfloor$. If the minimum size of a D2D resource pool is predefined, the number of bits may be further reduced. The minimum size of a D2D resource pool may be preset to a specific value or determined by the D2D signal unit. In this case, bits for resource configuration less than the minimum size of a D2D resource pool may not be used. For example, if the D2D unit size is 2, resource allocation used when the RB size is 1 is not necessary. In this case, if the resource configuration indication granularity is in an RB unit, the number of bits indicting a transmitted resource pool may be reduced as given by $\lceil \log_2(N_{RB}^{UL}(N_{RB}^{UL}+1)/2-N_{RB}^{UL}) \rceil$. If PUSCH resource allocation type 1 (i.e., non-contiguous frequency allocation) is used, $N_{RB}^{UL}$ may be replaced by $\lfloor N_{RB}^{UL}/M \rfloor$. In this case, if the minimum size is set for each cluster, the number of resource pool indication bits may be reduced by bits corresponding to a configuration less than the minimum cluster size. As another example, in the case where granularity of a D2D resource pool and an offset are signaled, the offset is preferably signaled in units of RBs. Alternatively, for simplicity, the granularity of the D2D resource pools may be signaled Indication of Time Resource Pool Configuration A bitmap for a time resource pool in units of subframes may be signaled. In this case, the length of the bitmap may be configured to be in units of radio frames or a predetermined subframe length (e.g., 40 ms). Alternatively, a set (e.g., {8, 10, 20, 40, 64, 128}) which can be configured as the length of the bitmap may be predetermined, and a bitmap having a length indicted by a specific element in the set may be signaled. The frequency resource pool configuration may not be indicated for every subframe, assuming that the same frequency resource pool is used in all D2D subframes. In this case, in order to indicate a radio frame/subframe to which the bitmap is applied, a subframe offset a may also be signaled. That is, application of the bitmap begins with a subframe indicated by subframe offset a to indicate a D2D resource region (resource pool). The size of a frequency pool may differ among subframes. In this case, a frequency resource pool configuration may be separately signaled for each subframe.

Meanwhile, if the period of the D2D resource pool exceeds a range in which a period can be expressed as a system frame number (SFN) (SFN ranges from 0 to 1023 and may indicate only positions within 10240 ms), it may not be possible to express the period with the existing SFN range. That is, if the period of a D2D resource pool exceeds 10.24 seconds, it cannot be expressed as an SFN, and thus another method to express the D2D resource pool is needed. In this case, one of the following methods may be used.

First, only a period within 10.24 s may be configured as the period of a D2D resource pool. That is, when a period that can be configured by a network is expressed in units of radio frames, 1024 is the maximum value of a period that can be configured.

Second, if the period of a D2D resource pool exceeds 10.24 s, particularly, if the period is a multiple of 10.24 s, it may be assumed that the network configures a resource pool only at a specific position among multiples of 10.24 s. For example, when 2048 radio frames are configured as the period, the eNB configures a D2D resource pool within the first 1024 radio frames. This operation may selectively occur only when the period of the D2D resource pool exceeds 1024. That is, if the period of the D2D resource pool is within 10.24 s, the eNB may definitely configure a resource pool. On the other hand, if the period of a D2D resource pool exceeds 10.24 s, the eNB may configure the D2D resource pool only at a specific position among multiples of 10.24 s (for example, if the period of the D2D resource pool is 20.48 s, the D2D resource pool may be configured only at an even multiple or odd multiple of 10.24 s).

Third, when a D2D resource pool is configured, an indication bit indicating the position corresponding to a multiple of 10.24 s at which the eNB configures the D2D resource pool may be transmitted. For example, if the maximum period of a D2D resource pool is 40.96 s, a 2-bit indicator is transmitted. Specifically, referring to FIG. 12, when the 2-bit pool configuration is signaled, the 2-bit indicator may be used as follows: i) If the indicator indicates 00, the current SFN is applied as the radio frame offset; ii) if the indicator indicates 01 or 11 and the period is 2048, SFN+1024 is applied as the radio frame offset; iii) if the indicator indicates 01, 10 or 11, and the period is 4096, a UE receiving a pool configuration having the period set to 4096 when the next pools are indicated by 01, 10 and 11 expects that the next pools will appear at offset+3072, offset+2048 and offset+1024.

Meanwhile, the D2D resource pool may not use a constant offset from SFN0. Instead, the offset value or resource pool spacing may vary among periods of resource pools. + or −x may be applied to the signaled or preset offset to vary the space between periods in configuring pools. Herein, a set of x values or the pattern of x values for respective periods may be differently configured according to ID of a (public safety or specific) group, a cell or cell group, or a PLMN. For example, a sequence of x values may be determined using the ID of the PLMN. This is intended to prevent pools of groups having different attributes from persistently overlapping, which obstructs resources of a specific pool from being used. In this case, a UE receiving configuration of a pool or a UE transmitting or receiving a D2D signal in the pool needs to know the position of the period corresponding to the received pool. In particular, if the period is beyond an SFN signaling range (1024 radio frames=10.24 s), the UE may not recognize the position of the period of the pool without explicit signaling. For example, if the range is set to 1024 radio frames, only pools having one period is present in the SFN signaling range, and thus the sequential positions of the pools may not be distinguished from each other. That is, when it is necessary to change the position of a pool for each period or to change a specific parameter related to the pool for each period, the following two methods may be used for a D2D transmission/reception UE to recognize the period index.

First, the aforementioned third method for expressing a D2D resource pool (transmitting an indication bit indicating the position at which a D2D resource period is configured among multiples of 1024 radio frames (SFN signaling range) may be used when it is desired to vary attributes for each period. Herein, the indication bit may be signaled to the UE through a physical layer signal or a higher layer signal. For example, signaling may be performed through an SIB for an RRC Idle UE. This method involves an indicator to recognize the sequential position of an SFN when the period exceeds an SFN signaling range and the period is unrecognizable. According to this method, when the D2D resource period is less than 1024 radio frames, the time position of the D2D resource pool may be varied by information indicating the sequential position of the period with respect to SFN0 and a bit indicating the position of the period among the signaled SFN periods. If the D2D resource period is greater than or equal to 1024 radio frames, the time position of the D2D resource pool may be determined by a signaled indication bit.

Seconds, the network may signal the sequential position of the period. With this method, the network may signal the sequential position of the corresponding period in each period, thereby allowing a D2D UE to recognize the sequential position of the period. In this case, the network may signal the sequential position of the period through a physical layer signal or a higher layer signal. To allow the RRC idle UE to recognize the position, signaling may be performed through an SIB. The position of the period may be indicated by N bits. After $2^N$ periods are indicated, a period may be signaled again by performing modulo operation.

Reception of Neighboring Cell D2D Synchronization Signal and Acquisition of Neighboring Cell Resource Configuration Therethrough Meanwhile, not only the D2D resource pool of a serving cell but also the D2D resource pool of a neighboring cell may be signaled through a physical layer or higher layer signal. Alternatively, multiple D2D resource pools may be configured in a cell. Only when the serving cell signals D2D resources of neighboring cells as mentioned above, D2D communication between UEs of different cells is possible. This is because the serving cell D2D UE needs to know the position of the D2D resource region of a neighboring cell to attempt decoding in the D2D resource region. The method for signaling the resource pools of neighboring cells may depend on whether or not timing synchronization is matched between the neighboring cells. Whether the serving cell is synchronized or unsynchronized with the neighboring cells may be determined based on higher layer signaling.

In the asynchronous network, a UE may receive an offset parameter indicating the transmission position of a D2D synchronization signal, and then receive the D2D synchronization signal using the offset parameter. The UE may assume that the D2D synchronization signal is transmitted within +/−x ms from the resource indicated by the offset parameter. Upon receiving the synchronization signal on this assumption, the UE may acquire a SF boundary of a neighboring cell and interpret the D2D resource pool of the neighboring cell.

The asynchronous network may be classified into two cases. In the first case, clock drift continues for calibration between cells such that the synchronization error between two cells is within a few milliseconds. In the second case, synchronization information cannot be acquired between networks, and thus even an approximate value of the error cannot be estimated. In the former, the offset information about the resource pool of a neighboring cell may be pre-signaled, and a UE receiving this information may search a D2DSS of the neighboring cell within the range of the offset or for +/−x msec around the offset and acquire the accurate SF boundary. In the latter case, on the other hand, it is not possible to know the offset information, and thus the UE should search all regions for the D2DSS of the neighboring cell. Accordingly, in the latter case, the UE needs to perform an operation of searching all the regions for the D2DSS of the neighboring cell. In addition, in the latter case, D2D resource pool information of the neighboring cell may be signaled based on SFN #0 of the neighboring cell (hereinafter, SFN #0 will refer to the start point of SFN #0, namely the start time of subframe #0 of SFN #0 unless stated otherwise). Upon receiving the D2DSS, the UE may acquire the SFN of the neighboring cell through D2DSS or PD2DSCH, and interpret the D2D resource pool of the neighboring cell based on the acquired SFN. If the PD2DSCH is not transmitted, all or some of the transmission period of the D2DSS, the SF number, and the radio frame number (radio frame offset) of the neighboring cell may be signaled. Thereby, the UE may detect the D2DSS and acquire the SFN of the neighboring cell.

Figure 13:
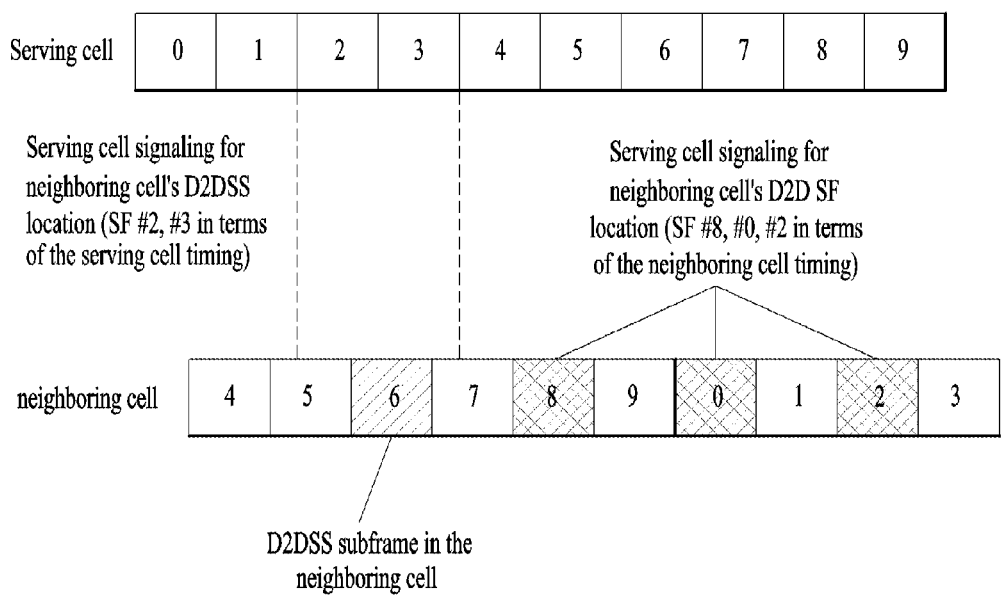

In the former case, transmission pool information about the neighboring cell D2DSS (the D2DSS transmission subframe, period, and the subframe/radio frame offset with respect to SFN0) may be pre-signaled to aid in searching the D2DSS of the neighboring cell. That is, the D2D resource pool of the neighboring cell and the region for transmission of the D2DSS of the neighboring cell as well as the D2D resource pool of the serving cell may be pre-signaled. In this case, the network may signal, through a physical layer signal or a higher layer signal, an approximate region in which the D2DSS of the neighboring cell is transmitted with respect to SFN #0 of the serving cell. For example, the region in which the D2DSS of the neighboring cell is transmitted may be signaled by being expressed in the form of an offset in the D2DSS transmission pool of the current serving cell. Alternatively, an approximate D2DSS transmission position of the neighboring cell may be expressed as an offset from SFN #0 of the serving cell and signaled, separately from the D2DSS transmission pool of the current serving cell. Once the (approximate) transmission region of the D2DSS of the neighboring cell is signaled in the manner described above, the UE searches the D2DSS of the neighboring cell first in order to receive a D2D signal of the neighboring cell. In this case, the D2DSS is searched in the region corresponding to the D2DSS transmission offset +/−x msec. Herein, the value of x may be predetermined or signaled through a higher layer signal. Once the D2DSS is successfully received, the SFN of the neighboring cell may be acquired through PD2DSCH or the D2DSS, and the position of the SFN at which the D2D resource pool of the neighboring cell is located may be identified among the SFNs of the neighboring cell. To this end, the D2D resource pool of the neighboring cell may be expressed based on SFN #0 of the neighboring cell and signaled through a physical layer signal or a higher layer signal. For example, the serving cell signals, to the UE, a certain time interval represented by timing of the serving cell (i.e., the time indicated by the SFN of the serving cell and a subframe index), signaling that D2DSS of a specific neighboring cell is transmitted in the timing. This interval, which may be a single subframe (i.e., a 1-ms interval) in terms of the serving cell timing, may be represented by a plurality of subframes (i.e., an interval longer than or equal to 1 ms) in consideration of a synchronization error between cells. FIG. 13 shows this example. Referring to FIG. 13, subframes 2 and 3 of the serving cell are designated as such subframes, and the UE attempts to detect D2DSS of the neighboring cell in a corresponding region. In the example of FIG. 13, it is assumed that the D2DSS is transmitted in subframe 6 of the neighboring cell which is present in the interval represented by subframes 2 and 3 of the serving cell. The UE may detect PD2DSCH associated with the D2DSS and acquire the accurate timing, SFN and subframe index of the neighboring cell. In addition, the serving cell signals the position of the D2D subframe of the neighboring cell. The position of this subframe is represented by the timing of the neighboring cell (i.e., a time indicated by an SFN and subframe index of the serving cell). In FIG. 13, subframes #8, #0 and #2 are allocated to D2D as the neighboring cell timing, and the UE identifies the D2D subframe position of the neighboring cell using the identified neighboring cell timing and serving cell signaling.

This operation may be implemented simply by signaling the D2D resource pool of the neighboring cell and an offset (wherein the offset is used to indicate the difference in timing between the neighboring cell and the serving cell). Herein, the offset in units of subframes or in a unit smaller than one subframe may be signaled. For example, the unit may be in μs. This unit is intended to indicate correct offset information as the serving cell is aware of information about misalignment of timing between the neighboring cell and the serving cell. If the offset in units of subframes is signaled, it is necessary to detect D2DSS of the neighboring cell and to accurately identify the SF boundary. Once the SF boundary and the SFN of the neighboring cell are identified (through D2DSS and/or PD2DSCH), the D2D resource pool of the neighboring cell may be recognized based on the SFN of the neighboring cell.

Meanwhile, the aforementioned timing offset between cells should be differentiated from the offset of each resource pool. In the description given above, the expression "based on the SFN" means an offset of the position of the D2D resource pool with respect to SFN #0, and the timing offset between cells means an offset intended to indicate misalignment of subframe boundaries between cells. In this way, the D2D resource pool of the neighboring cell is signaled through two different offsets. For simplicity, the timing offset between cells will be called offset 1, and an offset indicating the position of the D2D resource pool based on SFN#0 will be called offset 2. If there is no way to know the boundary of a neighboring cell in the asynchronous network, signaling of offset 1 may be omitted. That is, offset 1 may be signaled only when the cells are synchronized, or the degree of asynchrony between cells is approximated. Alternatively, the resource pool offset may be differently interpreted in some cases. Thereby, in the case of deployment with the cells synchronized or deployment in which the degree of asynchrony between cells can be approximately recognized, only one offset (=offset 1+offset 2) with respect to serving cell SFN#0 may be transmitted for the D2D resource pool of the neighboring cell. In the case of asynchronous deployment in which synchronization of the neighboring cell cannot be recognized, only one offset (=offset 2) with respect to neighboring cell SFN#0 may be transmitted. That is, one or two offsets may be signaled depending on the deployment. Alternatively, only one offset may be signaled, but the meaning of the offset may be differently interpreted according to deployment.

Meanwhile, a D2D UE may receive an offset parameter and a periodicity parameter, and use the same to determine the resource pool of a neighboring cell. Herein, the offset parameter and the periodicity parameter may be delivered through higher layer signaling and configured for the neighboring cell. In addition, the offset parameter and the periodicity parameter may be configured for PSCCH, PSDCH and the like and used in common.

As a specific method for determining the resource pool of a neighboring cell, the resource pool of a neighboring cell may be determined in consideration of relation between the periodicity parameter and a maximum possible number of subframes contained in a resource pool period set (i.e., the resource pool of a neighboring cell may be determined in consideration of whether the periodicity parameter is a divisor (e.g., 60, 70, 120, 140, 240, 280 ms, etc.) of the maximum possible number of subframes (10240) included in the resource pool period set.) If the periodicity parameter is a value that is not a divisor (70 ms) of the maximum possible number of subframes, TDD configuration may correspond to TDD UL/DL configuration 0 or 6. In determining the resource pool of the neighboring cell, the offset may be applied with respect to SFN 0 of the serving cell.

In particular, if the periodicity parameter is a value that is not a divisor of the maximum possible number of subframes, the UE may assume that the system frame numbers (SFNs) of the neighboring cell and the serving cell are aligned. This is intended to prevent mis-recognition of the period at the SFN cycle boundary (tail issue) when the periodicity parameter is not a divisor of the maximum possible number of subframes. For example, if the synchronization error between two cells is restricted to within a few milliseconds by continuing clock drift for calibration in the asynchronous network, an offset for the D2D resource pool of the neighboring cell may be signaled based on the SFN of the serving cell as in the case of the pool information about D2DSS. In this case, a non-contiguous point of a D2D resource pool period may occur at the boundary of one SFN cycle (1024 radio frames). That is, irregular interval between resource pools may be occurs. If the SFN of the serving cell does not coincide with that of the neighboring cell, the UE is likely to mis-recognize the D2D resource pool of the neighboring cell at the SFN cycle boundary. Details will be discussed with reference to FIG. 14.

Figure 14:
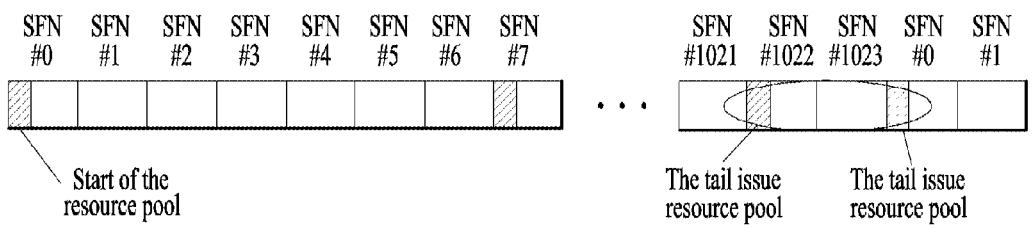

FIG. 14 shows an SFN cycle and the period of a resource pool. For simplicity, it is assumed that the value of the offset parameter is 0 and the period of the resource pool is 70 ms. As briefly mentioned above, if the period of the resource pool exceeds the maximum possible number of subframes (i.e., the SFN cycle, SFN 1023 in FIG. 14), the period of the resource pool ide re-determined based on SFN 0 of the serving cell. Accordingly, the UE having checked the resource pool from the first SFN, i.e., SFN #0 in FIG. 14 using the offset and the periodicity parameter determines that SFN #1022 is a resource pool. From SFN #0 which is the second SFN after SFN #1022 (an SFN after termination of the SFN cycle), the UE begins to check the resource pools, taking this SFN as a reference. As a result, the second SFN #0 of FIG. 14 is also recognized as a resource pool. In this case, the UE determines both SFN #1022 and SFN #0 as resource pools, and thus misalignment of periods occurs. To prevent this problem, if the periodicity parameter is not a divisor of the maximum possible number of subframes, it is assumed that the SFNs of the neighboring cell are aligned with the SFNs of the serving cell.

Subsequently, the UE may receive a signal of the neighboring cell in the resource pool determined according to the method described above.

As described above, if the resource pools of the neighboring cell are indicated based on the SFNs of the serving cell, an incorrect resource pool may be recognized at the SFN cycle boundary. In TDD, it may usually be assumed that synchronization is matched between cells with an error within a few milliseconds or microseconds. In this case, the SFNs of the serving cell may be identical to those of the neighboring cell, and thus the UE may recognize non-contiguousness of D2D resource pool periods at the SFN boundary. In FDD, SFNs of the neighboring cell may be recognized without explicit signaling thereof. For example, if both cells have the same D2DSS transmission period, and the synchronization error between the two cells is within +/−(D2DSS transmission period/2), the SFNs of the neighboring cell may be recognized based on the D2DSS reception time. Accordingly, if the SFN information on the neighboring cell is not explicitly signaled over a network or PD2DSCH, the network should be implemented such that the UE may constantly assume that the synchronization error between the two cells is within +/−(D2DSS transmission period/2).

In some cases, the SF index and/or boundary may differ between neighboring cells, and the index of a D2D resource pool may also differ between the neighboring cells. For example, suppose that SFs #0, #1 and #2 are used for a D2D resource pool in cell A, SFs #1, #2 and #3 are used for a D2D resource pool in cell B, and the timing offset between the two cells is 1 SF based on cell A. This case is illustrated in FIG. 14. In this case, a UE of cell A and a UE of cell B may recognize different SF indexes in SF #2 of cell A.

In this case, a D2D resource pool may be configured using the following methods. First, the resource pools of the serving cell may be signaled based on the SF indexes of the serving cell and the resource pools of the neighboring cell may be signaled based on the SF indexes of the neighboring cell. The SF offset is separately signaled, or a D2DSS transmission SF of the neighboring cell is signaled. In this case, an SF index in which D2DSS of the neighboring cell is transmitted may be signaled through a physical layer signal or a higher layer signal. Alternatively, the SF index in which D2DSS of the neighboring cell is transmitted may be invariably preset to a specific value or to an SF index transmitted from the serving cell (namely, the cells have the same SF index as an SF in which the D2DSS is transmitted). Second, the resource pools of the serving cell and the neighboring cell may be signaled based on the SF indexes of the serving cell. In this case, the SF index offset of the neighboring cell may be separately signaled through a higher layer signal, or the D2DSS transmission SF or D2DSS transmission region of the neighboring cell may be signaled through a physical layer signal or a higher layer signal, and an SF index in which the D2DSS of the neighboring cell is transmitted may be signaled through a physical layer signal or a higher layer signal. Alternatively, the SF index in which the D2DSS of the neighboring cell is transmitted may be invariably preset to a specific value or to a value identical to an SF index transmitted from the serving cell (namely, the cells have the same SF index as an SF in which the D2DSS is transmitted).

According to the methods proposed above, the D2D resource pool of the neighboring cell is signaled based on the SFNs or SF numbers of the neighboring cell. Alternatively, the D2D resource pool of the neighboring cell may be signaled based on timing (SFN, SF index) of the serving cell. When the D2D resource pool of the neighboring cell is signaled based on timing of the serving cell, SFs or radio frames of the D2D resource pool of the neighboring cell may not be completely synchronized in view of the serving cell, and thus the position of a signaled SF may not be distinguishable. This problem occurs when the synchronization offset between two cells is not an integer multiple of an SF level. To identify the position, one of the following three methods may be used.

Figure 15:
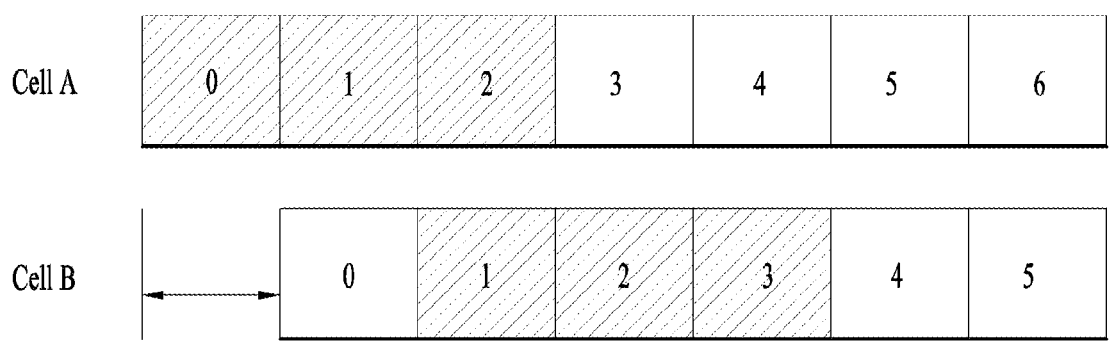

First, it may be assumed that the actual D2D resource pool of the neighboring cell exists at or after the time indicated by the serving cell. That is, the eNB of the serving cell must indicate the D2D resource pool of the neighboring cell such that the D2D resource pool of the neighboring cell exists at or after a time corresponding to an SF index indicated in consideration of an SF offset. FIG. 15 illustrates embodiments of how the serving cell indicates the D2D resource pool of the neighboring cell through SF indexes when the SF offset is positive (when the timing of the neighboring cell comes after the timing of the serving cell) and when the SF offset is negative. FIG. 15(*a*) illustrates a case where the serving cell signals SF indexes 2 and 3 of the serving cell as the D2D resource pool of the neighboring cell when the SF offset between two cells is a positive number. FIG. 15(*b*) illustrates a case where the serving cell signals SF indexes 1 and 2 of the serving cell as the D2D resource pool of the neighboring cell when the SF offset is a negative number.

Figure 16:
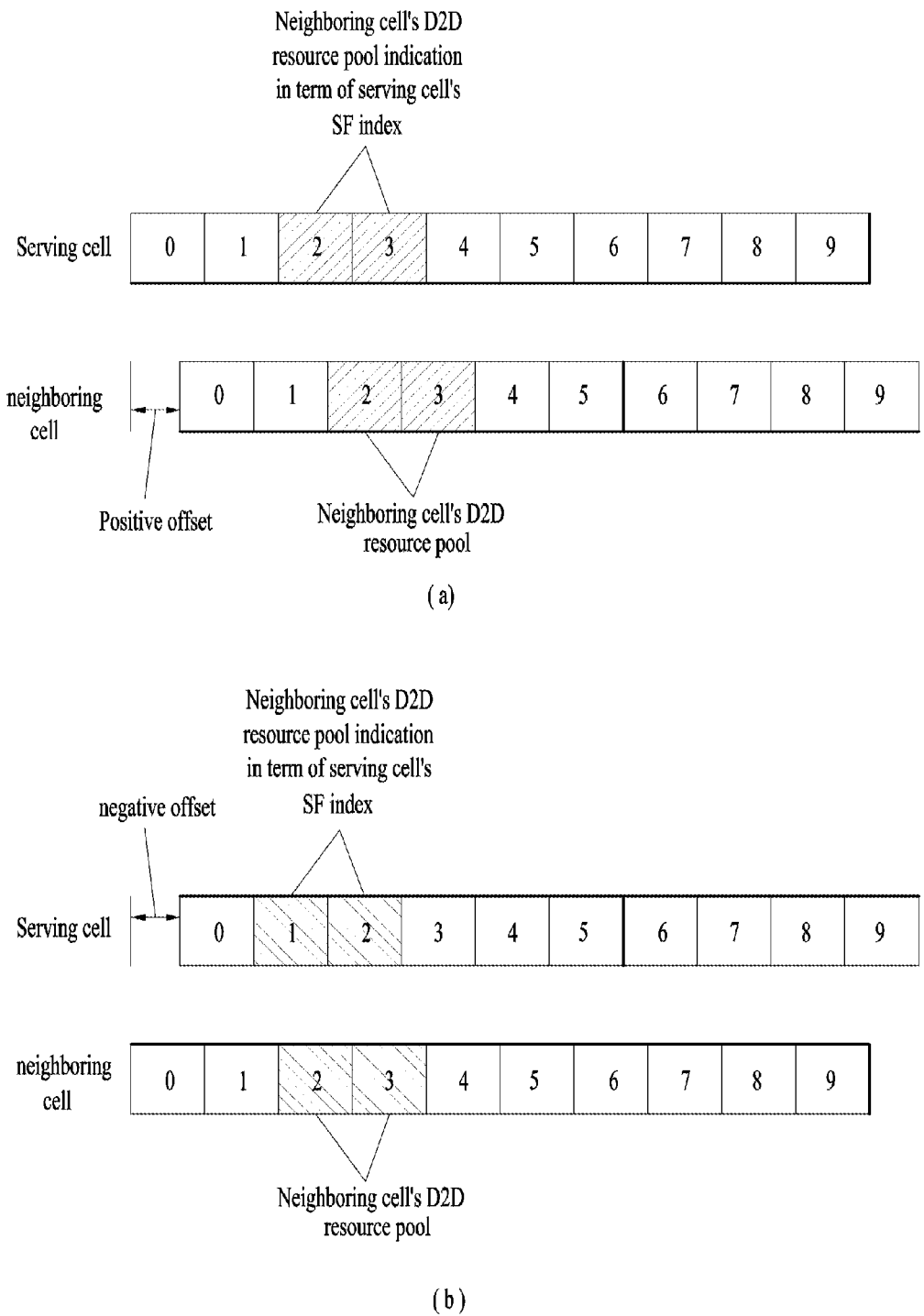

Second, it is assumed that the actual D2D resource pool of the neighboring cell exists at or before the time indicated by the serving cell. FIG. 16 illustrates a case where the serving cell indicates the D2D resource pool of the neighboring cell when synchronization between two cells has a positive offset with respect to the serving cell.

Figure 17:
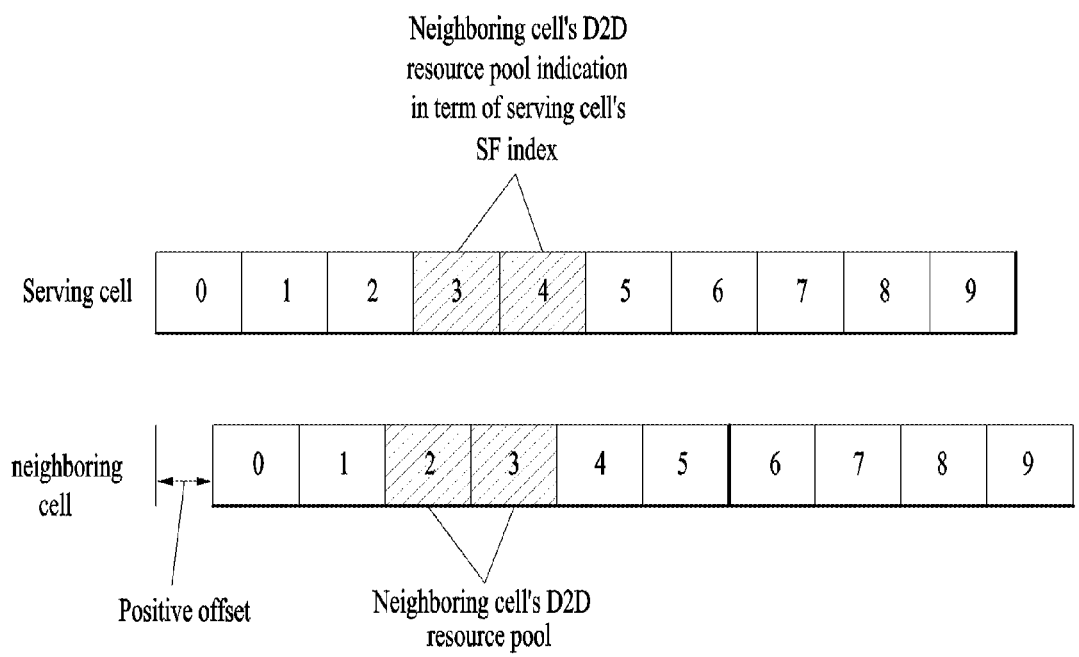
Figure 19:
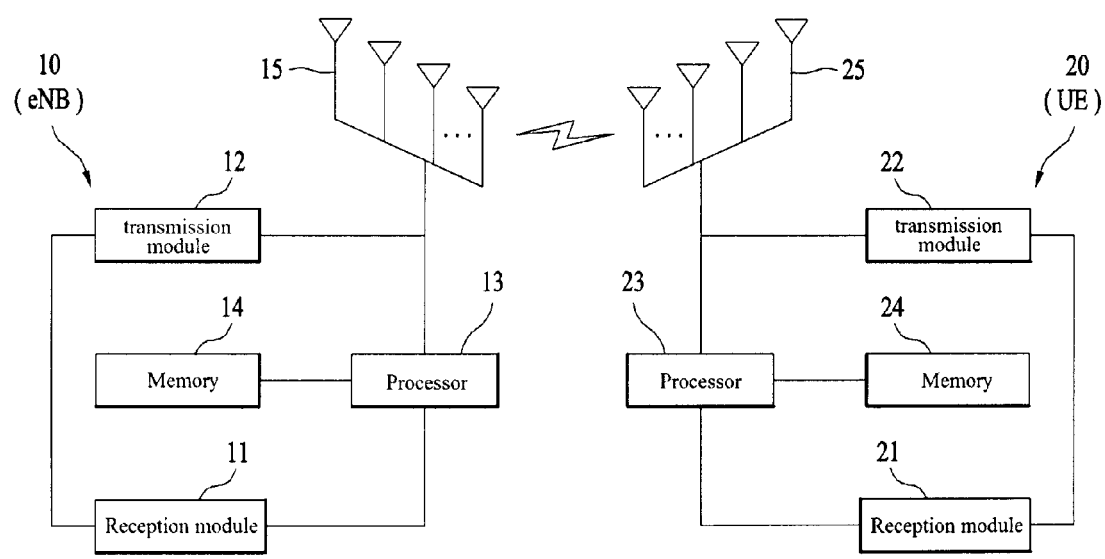
FIG. 19 illustrates configuration of transmission and reception apparatuses.

Third, it is assumed that the actual D2D resource pool of the neighboring cell exists within +/− a SFs with respect to the time indicated by the serving cell. For example, a may be 0.5 or half the CP length. The former case may be interpreted as meaning that the two cells are synchronized within units of SFs. In the latter case may be interpreted as meaning that synchronization is almost matched within units of symbols. This method corresponds to a case where the eNB of the serving cell indicates the D2D resource pool of the neighboring cell based on an SF closest to the current SF boundary. For example, if the timing offset of the neighboring cell is positive with respect to the timing of the serving cell and exceeds 0.5 SF, it is assumed that the D2D resource pool of the neighboring cell exists before the timing of the serving cell. If the timing offset of the neighboring cell is positive with respect to the timing of the serving cell but does not exceed 0.5 SF, it is assumed that the D2D resource pool of the neighboring cell exists after the timing of the serving cell. FIG. 17 illustrates this example. Even when the value of the offset is negative, the D2D resource pool of the neighboring cell may be signaled based on an SF closest to the boundary.

For example, suppose that a timing offset is produced between the serving cell and the neighboring cell at an SF level. When an offset of the SF level is produced between the serving cell and the neighboring cell, if a slot/SF index is involved in generating a scrambling sequence and DMRS sequence of a D2D signal (determining a hopping pattern and a DMRS CS (cyclic shift)/OCC (orthogonal cover code) hopping pattern), the D2D reception UE should perform decoding for different SF indexes. In this case, complexity of the reception UE may increases. To prevent the complexity from increasing, it is proposed that the slot/SF index be fixed to a specific value in generating the DMRS sequence and scrambling sequence of the D2D signal. With this method, decoding may be prevented from being performed several times using SF indexes of the serving cell and SF indexes of the neighboring cell when the neighboring cell and the serving cell are not accurately synchronized and thus SF indexes differ between the neighboring cell and the serving cell. In addition, the value of SF offset between the neighboring cell and the serving cell do not need to be separately signaled.

Figure 12:
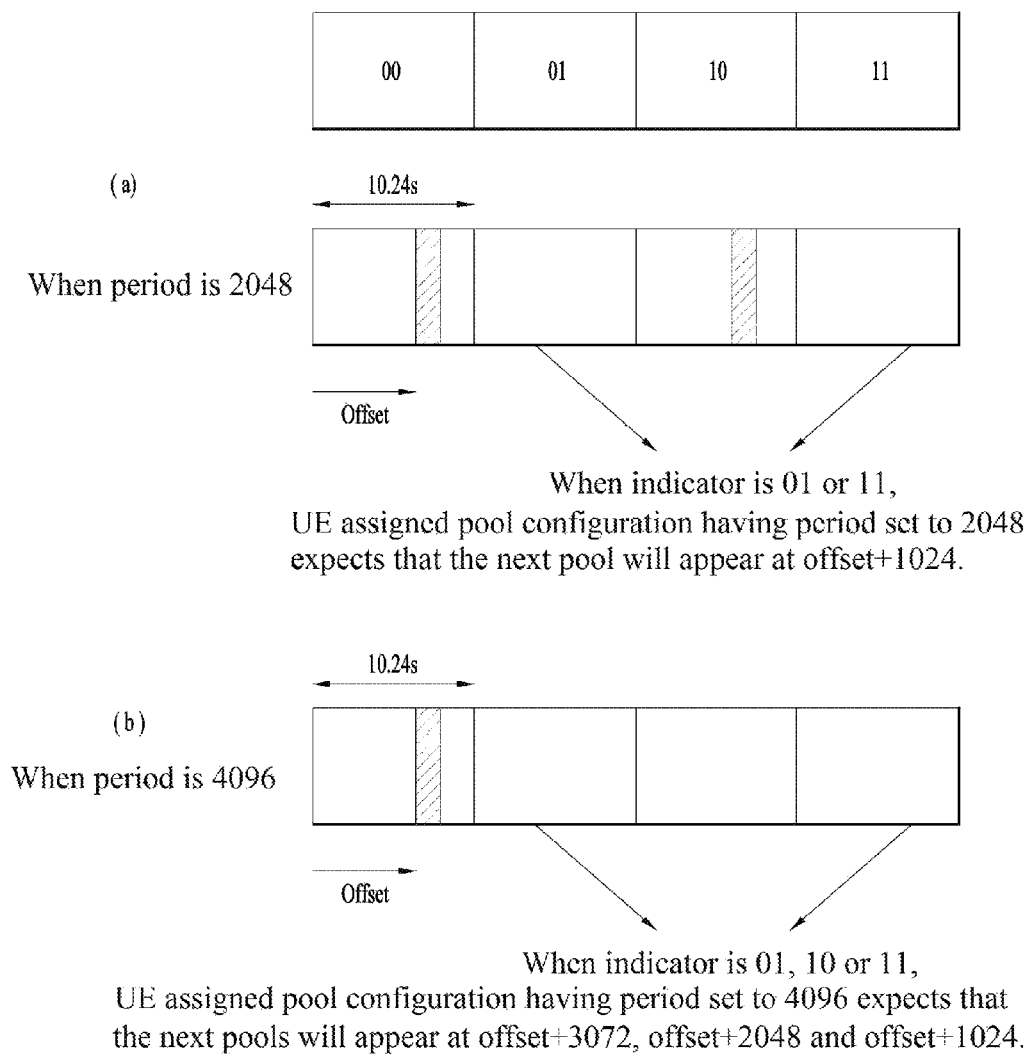

As another method, a network configuration may be restricted such that the SF level offset between the serving cell and the neighboring cell is fixed to 0. In this case, once the UE generates a DMRS and scrambling sequence in accordance with SF indexes of the serving cell, the sequences are directly applicable to the neighboring cell. If an offset in a time unit smaller than a subframe is present between the serving cell and the neighboring cell as illustrated in FIGS. 12 to 14, SF indexes of the neighboring cell are derived using the method described above, assuming that an offset between the SF index of the neighboring cell and the SF index of the serving cell at the SF level is 0. Alternatively, the operation of invariably setting the SF level offset to 0 may be restrictively applied only when the serving cell and the neighboring cell are synchronized (for example, D2DSS is shared therebetween). In this case, a neighboring cell which is not synchronized with the serving cell may still have an SF level offset different from 0 with respect to the serving cell. This operation may be generalized and applied to operation between neighboring cells (e.g., an operation in a situation where one neighboring cell serves as a reference for SF indexes and the other neighboring cells are assigned configuration of a resource pool based on the reference neighboring cell). For example, other neighboring cells sharing D2DSS with the reference neighboring cell operate (to, for example, generate a DMRS or a scrambling sequence) assuming that the SF level offset therebetween is 0, and the network configures the same SF indexes in the corresponding cells on this assumption.

In this case, it may be assumed that cells having D2D resource pools distinguished by a time offset are synchronized. Herein, being synchronized may mean that the SF boundaries are aligned between the cells and the SF indexes of one cell coincide with those of the other cell. In such synchronous network, a signal for the D2DSS transmission region of the neighboring cell may not be separately delivered. In this case, UEs may share a D2DSS sequence or a D2D resource pool, assuming that the serving cell is synchronized with the neighboring cell. Alternatively, the D2D resource pools of cells may be distinguished from each other by an offset. In this case, the offset simply means that the cells use different time resources to configure a D2D resource pool. In generating and decoding a DMRS sequence or a scrambling sequence, all signals are transmitted/received based on the SF indexes of the serving cell. Information indicating that a neighboring cell is synchronized with the serving cell may be pre-signaled through a physical layer or a higher layer signal, or it may be pre-assumed that cells belonging to a specific group of cell IDs are synchronized. In this case, the network may pre-signal the group of synchronized cell IDs to the UE through a physical layer signal or a higher layer signal.

In another case, the SF boundaries may be aligned between the neighboring cells, but the neighboring cells may have different SF indexes. In this case, the eNB of the serving cell may signal an SF offset between the serving cell and a neighboring cell to the UE through a physical layer signal or a higher layer signal. This offset may be used to instruct the D2D signal transmission UE to generate a DMRS sequence or a scrambling sequence according to SF indexes of a specific cell in consideration of the SF offset. Alternatively, the SF offset may be used for the D2D signal reception UE to recognize and decode the DMRS sequence and scrambling sequence of a neighboring cell in consideration of the SF offset.

Similar to the feature that a D2DSS or D2D resource pool can be shared between synchronized cells, some cells in an asynchronous system may have identical SF boundaries and SF indexes. In this case, a D2D resource pool and a D2DSS transmission region may be shared. In this case, all or some of information on D2D resource pools of other asynchronous neighboring cells and a neighboring cell group, a resource SF offset, a region in which D2DSS is transmitted, an SF index in which D2DSS is transmitted, and an offset may be shared between synchronized cells.

The proposed method may be applied not only to inter-cell operation but also to inter-frequency and inter-operator D2D operations. For example, suppose that the network operator operates multiple carriers. In this case, the network timing of another frequency band may be different from timing of a current serving cell. In this case, the network signals an approximate D2DSS transmission region of another cell to the UE through a physical layer signal or a higher layer signal, based on the SFNs of the current serving cell. In addition, the network expresses a D2D resource pool of another frequency with respect to SFN #0 of a corresponding cell and signals the same through a physical layer signal or a higher layer signal. The UE only needs to receive a D2D signal in the D2D resource pool of the neighboring cell by detecting D2DSS of the neighboring cell and then identifying the SFN of the cell.

Some of the aforementioned methods for resource pool configuration may also be used in configuring the transmission resources for D2DSS. In this case, D2DSS transmission pools of the serving cell and the neighboring cell may be signaled in the form of a subframe (or radio frame) offset transmitted with respect to SFN 0 (of the serving cell or neighboring cell), a bitmap and a period.

In TDD, the transmission period of D2DSS may be set differently over the transmission period in FDD. This may be intended to secure many D2D signal transmission SFs since the number of UL SFs in TDD is smaller than in FDD, Alternatively, the D2DSS transmission period may be set to be longer than in FDD in order to attenuate impact on cellular uplink. Herein, a D2DSS period longer than in FDD may be used irrespective of the TDD UL/DL configuration, or may be differently set for each TDD UL/DL configuration. For example, if FDD employs 40 ms or 80 ms as the D2DSS transmission period, TDD employs 80 ms or 160 ms as the D2DSS transmission period.

Alternatively, in TDD, D2DSS may be differently set for each configuration. That is, D2DSS transmission periods are set to be associated with/related to UL HARQ periods in order to ensure natural coexistence with a cellular HARQ process. For example, the HARQ period for TDD UL/DL configuration 0 is 70 ms, and thus the transmission period of D2DSS may be set to 70 ms or a multiple thereof. Similarly, the HARQ period for TDD UL/DL configuration 6 is 60 ms, and thus the period of D2DSS may be set to 60 ms or a multiple thereof. For TDD UL/DL configuration 5, the HARQ period is 10 ms and only one UL SF is present in one radio frame, and thus the transmission period of D2DSS may be set to a relatively large multiple of the HARQ period (e.g., 80 ms or 160 ms), in order to secure UL resources. For the other TDD UL/DL configurations, the same D2DSS periods as in FDD may be used, separate D2DSS periods different from those for FDD may be used, or D2DSS transmission periods may be set to multiples of the HARQ period in connection with the number of UL SFs per radio frame. As a method to perform transmission in connection with the number of UL SFs, as the number of UL SFs decreases, the D2DSS transmission period to be used is increased. This is intended to increase the number of subframes used for D2D signal transmission. For example, if the D2DSS period used in TDD UL/DL configuration 1 is 80 ms, the D2DSS period used in TDD UL/DL configuration 2 is 160 ms since the number of UL SFs for TDD configuration 2 is half the number of UL SFs for configuration 1. Table 1 shows exemplary D2DSS periods for respective TDD UL/DL configurations. Referring to the table, TDD UL/DL configurations 1 to 5 are configured to use the same period.

efficient use of limited UL resources rather than performance. This rule may be selectively applied only to a specific TDD configuration (e.g., TDD UL/DL configuration 5) in TDD. That is, importance of efficient use of resources may be reflected for TDD UL/DL configuration 5 because TDD UL/DL configuration 5 has a relatively small number of UL SFs, while TDD UL/DL configurations 0 and 6 have a relatively large number of UL SFs.

In the case where the transmission period of D2DSS differs among the TDD UL/DL configurations, or FDD and TDD use different D2DSS transmission periods, if the D2DSS reception UE is positioned in another cell or out of the coverage, but the UE does not correctly recognize information about the TDD/FDD duplex mode or TDD UL/DL configuration information, the UE may not accurately recognize the D2DSS transmission period and thus attempt D2DSS detection in an incorrect period after initial D2DSS detection. To prevent this problem, i) a D2DSS sequence may be differently used for each TDD UL/DL configuration or TDD/FDD. Alternatively, ii) TDD/FDD duplex mode information and/or TDD UL/DL configuration information may be transmitted through PD2DSCH. Alternatively, iii) the period of D2DSS be explicitly transmitted through the PD2DSCH. Alternatively, iv) information about the D2DSS period of a neighboring cell or information from which the D2DSS period can be derived may be signaled to the UE through a physical layer signal or a higher layer signal. The methods i) to iv) may be selectively configured depending on whether the UE receiving the D2DSS is in the neighboring cell or out of the coverage. For example, if the UE receiving the D2DSS is in the neighboring cell, method iv) may be used. If the UE receiving the D2DSS is out of the coverage of the network, method iii) may be used.

TABLE 1

| Uplink-downlink configuration | Downlink-to-Uplink Switch-point periodicity | 0 | 1 | 2 | 3 | 4 | 5 | 6 | 7 | 8 | 9 | D2DSS period (ms) |
|---|---|---|---|---|---|---|---|---|---|---|---|---|
| 0 | 5 ms | D | S | U | U | U | D | S | U | U | U | 70 ms |
| 1 | 5 ms | D | S | U | U | D | D | S | U | U | D | 80 ms |
| 2 | 5 ms | D | S | U | D | D | D | S | U | D | D | 80 ms |
| 3 | 10 ms | D | S | U | U | U | D | D | D | D | D | 80 ms |
| 4 | 10 ms | D | S | U | U | D | D | D | D | D | D | 80 ms |
| 5 | 10 ms | D | S | U | D | D | D | D | D | D | D | 80 ms |
| 6 | 5 ms | D | S | U | U | U | D | S | U | U | D | 60 ms |

Meanwhile, a rule may be established such that no other D2D signal is transmitted in a region other than the frequency region in which D2DSS is transmitted, in subframes in which the D2DSS is transmitted. This is intended to prevent D2DSS from being subjected to severe interference due to in-band emission, which may be caused when a D2D signal is transmitted in another frequency region. In TDD, however, the number of UL SFs is smaller than in FDD, and transmission of other D2D signals or WAN signals may be allowed in SFs in which D2DSS is not transmitted, in order to effectively use resources. In this case, in order to attenuate in-band emission to D2DSS, some RBs around an RB on which D2DSS is transmitted may be configured as a guard region, in which no signal is transmitted. Here, it should be noted that the frequency regions except the D2DSS transmission frequency are left empty in terms of performance in FDD since there are many UL SFs in FDD, while transmission in frequency regions other than the D2DSS transmission frequency region is allowed in TDD in order to ensure Meanwhile, the aforementioned method that signaling period of D2DSS explicitly is not changed only according to TDD UL/DL configuration or TDD/FDD duplex mode. That method may be used other purpose, i.e., more/less frequent transmission of D2DSS is needed. For example, UE that is in fast motion needs more frequent transmission of D2DSS. In this case, period of D2DSS may be changed and the information of period change may be signaled by network of UE for acknowledgement of receiving UE.

Generation of Scrambling Sequence

Hereinafter, a method for generating a scrambling sequence in D2D will be described. In generating a scrambling sequence of legacy LTE PUSCH, initialization parameter configuration is determined by the equation $c_{init} = n_{RNTI} \cdot 2^{14} + q \cdot 2^{13} + \lfloor n_s/2 \rfloor \cdot 2^9 + N_{ID}^{cell}$. Herein, for a D2D signal, $n_{RNTI}$ and $N_{ID}^{cell}$ may be set to different values according to D2D characteristics. For example, an ID included in SA (scheduling assignment) or a cell ID may be set to a value (e.g. 510) out of the legacy cell ID range.

Herein, $n_s$ may be fixed to a specific value in generating a scrambling sequence of the D2D signal. For example, $n_s$ may be set to 0 irrespective of the slot index. Alternatively, this variable may be set to different values according to the D2D signal type or mode.

A DMRS sequence of legacy LTE PUSCH is generated by the following equation.

$$x_q(m) = e^{-j\frac{\pi q m(m+1)}{N_{ZC}^{RS}}}, \ 0 \leq m \leq N_{ZC}^{RS} - 1$$

$$q = \lfloor \bar{q} + 1/2 \rfloor + v \cdot (-1)^{\lfloor 2\bar{q} \rfloor}$$

$$\bar{q} = N_{ZC}^{RS} \cdot (u+1)/31$$

$$u = (f_{gh}(n_s) + f_{ss}) \bmod 30$$

$$f_{gh}(n_s) = \begin{cases} 0 & \text{if group hopping is disabled} \\ \left( \sum_{i=0}^{7} c(8n_s + i) \cdot 2^i \right) \bmod 30 & \text{if group hopping is enabled} \end{cases}$$

$$c_{init} = \left\lfloor \frac{n_{ID}^{RS}}{30} \right\rfloor$$

$$f_{ss}^{PUSCH} = (N_{ID}^{cell} + \Delta_{ss}) \bmod 30$$

In this equation, $N_{ID}^{cell}$ is the value of a cell ID, and $\Delta_{ss}$ has a value received by a higher layer. The value of v is determined $$\text{by } v = \begin{cases} c(n_s) & \text{if group hopping is disabled and sequence hopping is enabled} \\ 0 & \text{otherwise} \end{cases}.$$

Herein, $c_{init}$ for c(i) is determined by $$c_{init} = \left\lfloor \frac{n_{ID}^{RS}}{30} \right\rfloor \cdot 2^5 + f_{ss}^{PUSCH}.$$

The value of $n_{ID}^{RS}$ is determined by the cell ID or higher layer signaling, and $f_{ss}^{PUSCH}$ is determined by the equation given above. Herein, $n_{ID}^{RS}$, $N_{ID}^{cell}$ and $\Delta_{ss}$ may be set to different values in D2D. For example, $n_{ID}^{RS}$ may be generated by the ID included in SA, $N_{ID}^{cell}$ may be set to a value (e.g. 510 or 511) out of the cell ID range or the sum of a value out of the ID range and the ID included in SA, and $\Delta_{ss}$ may be set to 0. In the above equation for generating a DMRS, $n_s$ may be fixed to a specific value, used as a slot index of a specific cell, or determined by an SF offset between neighboring cells in the slot index of the serving cell.

Configuration of Apparatuses According to an Embodiment of the Present Invention FIG. 18 is a diagram illustrating configurations of a transmission point and a UE according to an embodiment of the present invention.

Referring to FIG. 18, a transmission point 10 may include a reception module 11, a transmission module 12, a processor 13, a memory 14, and a plurality of antennas 15. The antennas 15 represent a transmission point that supports MIMO transmission and reception. The reception module 11 may receive various signals, data and information from a UE on uplink. The transmission module 12 may transmit various signals, data and information to a UE on downlink. The processor 13 may control overall operation of the transmission point 10.

The processor 13 of the transmission point 10 according to one embodiment of the present invention may perform operations necessary for the embodiments described above.

Additionally, the processor 13 of the transmission point 10 may function to operationally process information received by the transmission point 10 or information to be transmitted to the outside, etc. The memory 14, which may be replaced with an element such as a buffer (not shown), may store the processed information for a predetermined time.

Referring to FIG. 18, a UE 20 may include a reception module 21, a transmission module 22, a processor 23, a memory 24, and a plurality of antennas 25. The antennas 25 mean that the UE supports MIMO transmission and reception. The reception module 21 may receive various signals, data and information from an eNB on downlink. The transmission module 22 may transmit various signals, data and information to the eNB on uplink. The processor 23 may control overall operation of the UE 20.

The processor 23 of the UE 20 according to one embodiment of the present invention may perform operations necessary for the embodiments described above.

Additionally, the processor 23 may function to operationally process information received by the UE 20 or information to be transmitted to the outside, and the memory 24, which may be replaced with an element such as a buffer (not shown), may store the processed information for a predetermined time.

The configurations of the transmission point and the UE as described above may be implemented such that the above-described embodiments are independently applied or two or more thereof are simultaneously applied, and description of redundant parts is omitted for clarity.

Description of the transmission point 10 in FIG. 18 may also be applied to a relay which serves as a downlink transmitter or an uplink receiver, and description of the UE 20 may be applied to a relay which serves as a downlink receiver or an uplink transmitter.

The embodiments of the present invention may be implemented through various means, for example, hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to have the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to have the widest scope consistent with the principles and novel features disclosed herein. In addition, claims that are not explicitly cited in each other in the appended claims may be presented in combination as an embodiment of the present invention or included as a new claim by subsequent amendment after the application is filed.

The embodiments of the present invention as described above are applicable to various mobile communication systems.

As apparent from the above description, the present invention has effects as follows.

According to embodiments of the present invention, ambiguity of a period of a resource pool which may occur at the end of a system frame number cycle may be addressed. Accordingly, a UE may stably receive a neighboring cell signal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for receiving a signal of a neighboring cell by a Device-to-Device (D2D) terminal in a wireless communication system, the method comprising:
receiving one or more parameters from a serving cell of the D2D terminal, the one or more parameters including a periodicity parameter of the serving cell;
determining a repetition pattern of a resource pool of a neighboring cell in consideration of a relation between the periodicity parameter of the serving cell and a system frame number (SFN) cycle,
wherein, when the periodicity parameter is a value that is not a divisor of the SFN cycle, the D2D terminal determines the repetition pattern by assuming that SFNs of the resource pool are aligned with SFNs of the serving cell; and
receiving the signal of the neighboring cell in the determined repetition pattern of the resource pool.

2. The method according to claim 1, wherein the one or more parameters includes an offset parameter.

3. The method according to claim 1, wherein, when the periodicity parameter is the value that is not the divisor of the SFN cycle, a corresponding time division duplex (TDD) configuration corresponds to configuration 0.

4. The method according to claim 3, wherein the value is 70 ms.

5. The method according to claim 1, wherein, when determining of the resource pool of the neighboring cell is performed, an offset is applied based on SFN 0 of the serving cell.

6. The method according to claim 1, wherein the SFN cycle is 10240 subframes.

7. The method according to claim 1, wherein, when a period of the resource pool exceeds the SFN cycle, the period of the resource pool is re-determined based on SFN 0 of the serving cell.

8. A Device-to-Device (D2D) terminal in a wireless communication system comprising:
a reception module; and
a processor,
wherein the processor is configured to:
receive one or more parameters from a serving cell of the D2D terminal, the one or more parameters including a periodicity parameter of the serving cell;
determine a repetition pattern of a resource pool of a neighboring cell in consideration of a relation between the periodicity parameter of the serving cell and a system frame number (SFN) cycle,
wherein, when the periodicity parameter is a value that is not a divisor of the SFN cycle, the processor determines the repetition pattern by assuming that SFNs of the resource pool are aligned with SFNs of the serving cell; and
receive the signal of the neighboring cell in the determined repetition pattern of the resource pool.

9. The D2D terminal according to claim 8, wherein the one or more parameters includes an offset parameter.

10. The D2D terminal according to claim 8, wherein, when the periodicity parameter is the value that is not the divisor of the SFN cycle, a corresponding time division duplex (TDD) configuration corresponds to configuration 0.

11. The D2D terminal according to claim 10, wherein the value is 70 ms.

12. The D2D terminal according to claim 8, wherein, in determining the resource pool of the neighboring cell is performed, an offset is applied based on SFN 0 of the serving cell.

13. The D2D terminal according to claim 8, wherein the SFN cycle is 10240 subframes.

14. The D2D terminal according to claim 8, wherein, when a period of the resource pool exceeds the SFN cycle, the period of the resource pool is re-determined based on SFN 0 of the serving cell.

* * * * *